(12) United States Patent
McWaid et al.

(10) Patent No.: US 11,142,834 B2
(45) Date of Patent: *Oct. 12, 2021

(54) ANODE ASSEMBLY, CONTACT STRIPS, ELECTROCHEMICAL CELL, AND METHODS TO USE AND MANUFACTURE THEREOF

(71) Applicant: Calera Corporation, Moss Landing, CA (US)

(72) Inventors: Thomas H McWaid, Santa Cruz, CA (US); Ryan J Gilliam, San Jose, CA (US); Hong Zhao, Marina, CA (US); Michael Kostowskyj, Aptos, CA (US)

(73) Assignee: Calera Corporation, Moss Landing, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/523,929

(22) Filed: Jul. 26, 2019

(65) Prior Publication Data

US 2019/0345621 A1 Nov. 14, 2019

Related U.S. Application Data

(63) Continuation of application No. 15/605,844, filed on May 25, 2017, now Pat. No. 10,407,783.

(Continued)

(51) Int. Cl.
*C25B 13/02* (2006.01)
*C25B 9/65* (2021.01)

(Continued)

(52) U.S. Cl.
CPC ............... *C25B 9/66* (2021.01); *B23K 20/08* (2013.01); *B23K 26/34* (2013.01); *C25B 1/46* (2013.01);

(Continued)

(58) Field of Classification Search
CPC .. C25B 13/02; C25B 9/00; C25B 9/18; C25B 11/02; C25B 9/04; C25B 9/16
See application file for complete search history.

(56) References Cited

U.S. PATENT DOCUMENTS 4,108,752 A 8/1978 Pohto et al.
4,111,779 A 9/1978 Seko et al.
(Continued)

FOREIGN PATENT DOCUMENTS

CN 85106624 A 4/1987
CN 1198969 A 11/1998
(Continued)

OTHER PUBLICATIONS

Andersson, et al. High power diode laser cladding. Fabricating and Metalworking. Mar. 2014; 24-26.
(Continued)

*Primary Examiner* — Zulmariam Mendez
(74) *Attorney, Agent, or Firm* — Calera Corporation; Vandana Bansal

(57) ABSTRACT

Provided herein are anode assembly, conductive contact strips, electrochemical cells containing the anode assembly and the conductive contact strips, and methods to use and manufacture the same, where the anode assembly includes a plurality of V-shaped, U-shaped, or Z-shaped elements positioned outside the anode shell and in electrical contact with the anode.

20 Claims, 10 Drawing Sheets

Related U.S. Application Data

(60) Provisional application No. 62/442,163, filed on Jan. 4, 2017, provisional application No. 62/341,941, filed on May 26, 2016.

(51) Int. Cl.

| | | |
|---|---|---|
| *C25B 9/19* | (2021.01) | |
| *C25B 9/70* | (2021.01) | |
| *B23K 20/08* | (2006.01) | |
| *B23K 26/34* | (2014.01) | |
| *C25B 1/46* | (2006.01) | |
| *C25B 11/02* | (2021.01) | |
| *C25B 13/04* | (2021.01) | |
| *B23K 101/38* | (2006.01) | |
| *B23K 103/12* | (2006.01) | |
| *B23K 103/14* | (2006.01) | |
| *B23K 103/16* | (2006.01) | |

(52) U.S. Cl.
CPC ............. *C25B 9/19* (2021.01); *C25B 9/70* (2021.01); *C25B 11/02* (2013.01); *C25B 13/04* (2013.01); *B23K 2101/38* (2018.08); *B23K 2103/12* (2018.08); *B23K 2103/14* (2018.08); *B23K 2103/166* (2018.08)

(56) References Cited

U.S. PATENT DOCUMENTS

| | | |
|---|---|---|
| 4,116,807 A | 9/1978 | Peters et al. |
| 4,279,731 A | 7/1981 | Pellegri et al. |
| 4,389,298 A | 6/1983 | Pellegri |
| 4,643,818 A | 2/1987 | Seko et al. |
| 4,664,770 A | 5/1987 | Schmitt et al. |
| 5,399,250 A | 3/1995 | Moon et al. |
| 5,718,618 A | 2/1998 | Guckel et al. |
| 6,282,774 B1 | 9/2001 | Borucinski et al. |
| 6,503,377 B1 | 1/2003 | Borucinski et al. |
| 8,733,422 B2 | 5/2014 | Browning et al. |
| 8,956,784 B2 | 2/2015 | Iyer et al. |
| 9,062,383 B2 | 6/2015 | Ottaviani et al. |
| 9,187,834 B2 | 11/2015 | Albrecht et al. |
| 9,187,835 B2 | 11/2015 | Albrecht et al. |
| 9,200,375 B2 | 12/2015 | Gilliam et al. |
| 9,243,336 B2 | 1/2016 | Koehler et al. |
| 9,957,621 B2 | 5/2018 | Albrecht et al. |
| 9,957,623 B2 | 5/2018 | Gilliam et al. |
| 10,407,783 B2 | 9/2019 | McWaid et al. |
| 2004/0007458 A1 | 1/2004 | Fujita |
| 2009/0050472 A1 | 2/2009 | Federico et al. |
| 2010/0108537 A1 | 5/2010 | Perego et al. |
| 2011/0076587 A1 | 3/2011 | Wang et al. |
| 2011/0259735 A1 | 10/2011 | Ottaviani et al. |
| 2012/0292196 A1 | 11/2012 | Albrecht et al. |
| 2014/0004270 A1 | 1/2014 | Sherman et al. |
| 2014/0353146 A1 | 12/2014 | Gilliam et al. |
| 2015/0038750 A1 | 2/2015 | Weiss et al. |
| 2015/0337443 A1 | 11/2015 | Albrecht et al. |
| 2015/0361564 A1 | 12/2015 | Albrecht et al. |
| 2016/0040304 A1 | 2/2016 | Albrecht et al. |
| 2016/0060774 A1 | 3/2016 | Gilliam et al. |
| 2016/0076156 A1 | 3/2016 | Albrecht et al. |
| 2016/0108529 A1 | 4/2016 | Albrecht et al. |
| 2016/0131612 A1 | 5/2016 | Gilliam et al. |
| 2016/0230291 A1 | 8/2016 | Albrecht et al. |
| 2016/0273116 A1 | 9/2016 | Gilliam et al. |
| 2017/0073823 A1 | 3/2017 | Albrecht et al. |
| 2017/0121832 A1 | 5/2017 | Albrecht et al. |
| 2017/0250428 A1 | 8/2017 | Gilliam et al. |
| 2017/0309969 A1 | 10/2017 | Miller et al. |

FOREIGN PATENT DOCUMENTS

| | | |
|---|---|---|
| CN | 1204296 A | 1/1999 |
| CN | 101265587 A | 9/2008 |
| CN | 201439544 U | 4/2010 |
| CN | 105177572 A | 12/2015 |
| DE | 10022604 A1 | 11/2001 |
| EP | 0565836 A1 | 10/1993 |
| WO | WO-2010055152 A1 | 5/2010 |
| WO | WO-2014023572 A2 | 2/2014 |
| WO | WO-2017205676 A1 | 11/2017 |

OTHER PUBLICATIONS

Gao et al. Effects of weld cross-section profiles and microstructure on properties of pulsed Nd:YAG laser welding of Ti6Al4V sheet. International Journal of Advanced Manufacturing Technology, vol. 72, Mar. 1, 2014, p. 895-903.
International search report with written opinion dated Aug. 15, 2017 for PCT/US2017/034554.
U.S. Appl. No. 15/605,844 Notice of Allowance dated Jul. 19, 2019.
U.S. Appl. No. 15/605,844 Office Action dated Oct. 1, 2018.
U.S. Appl. No. 15/605,844 Office Action dated Apr. 17, 2019.
EP17803621.6 Extended European Search Report dated Feb. 28, 2020.

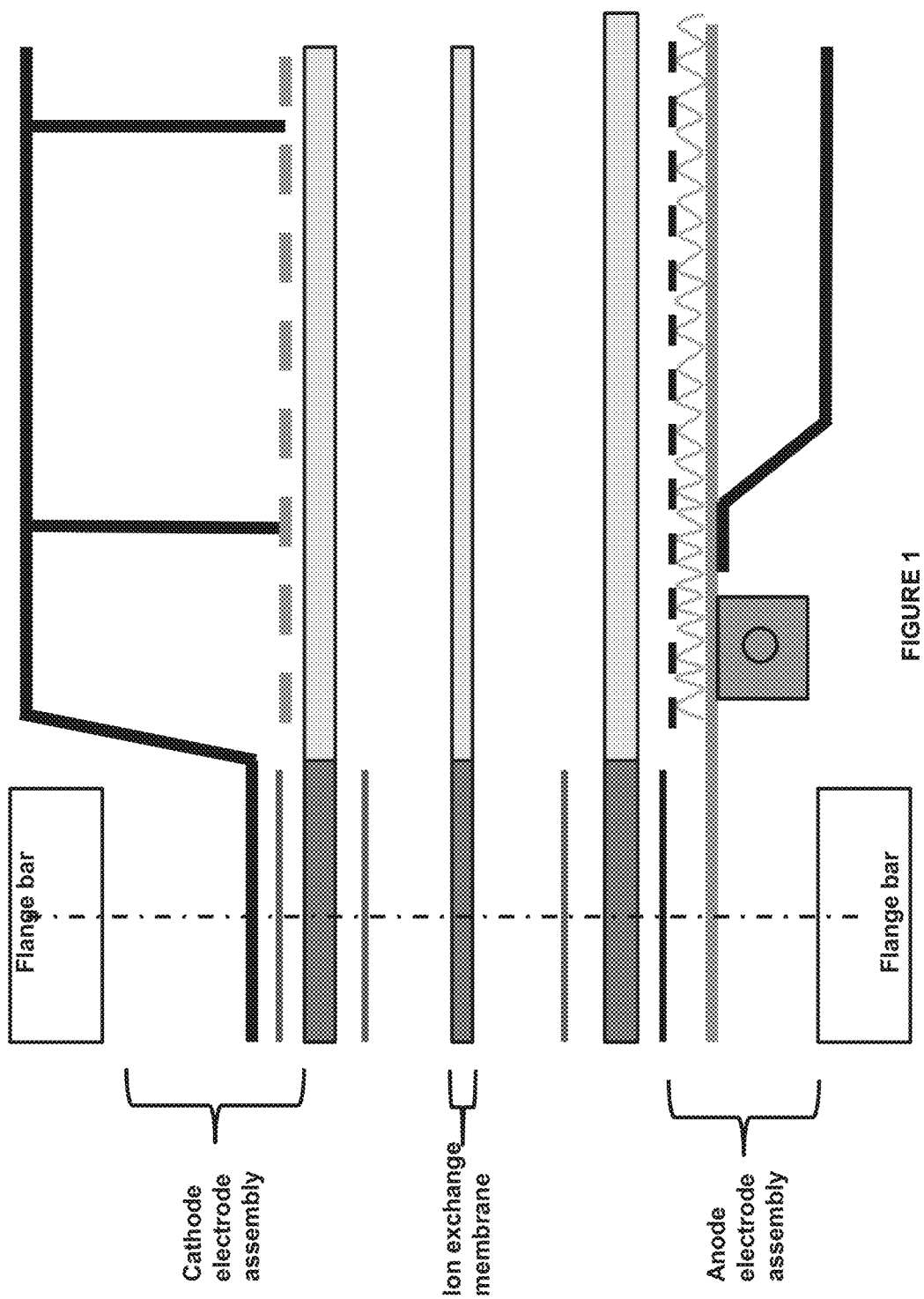

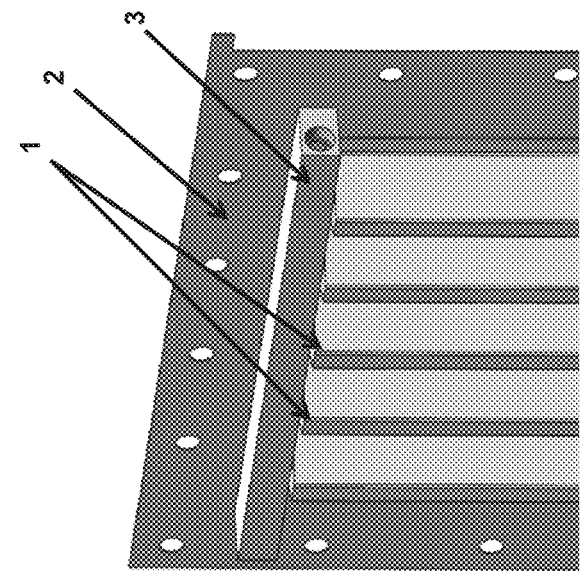
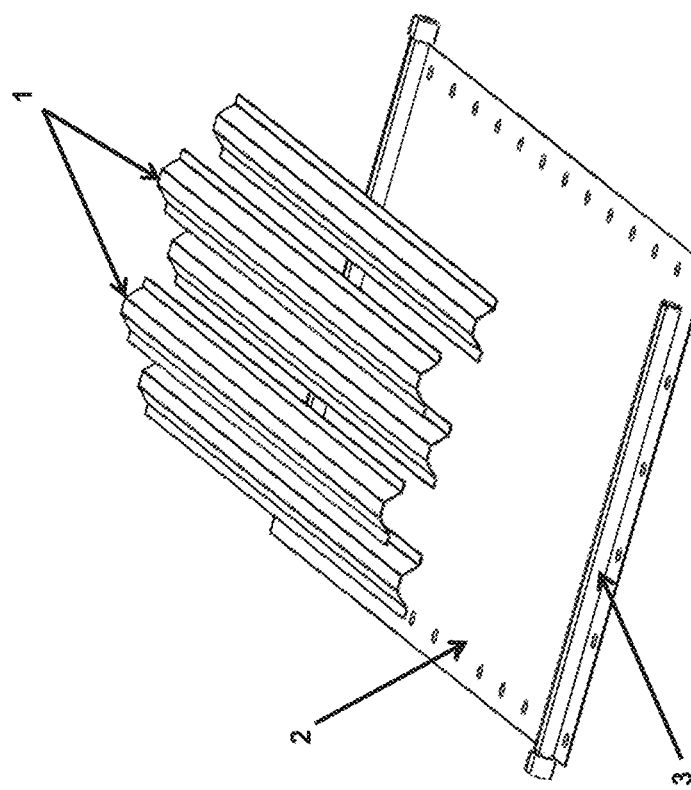
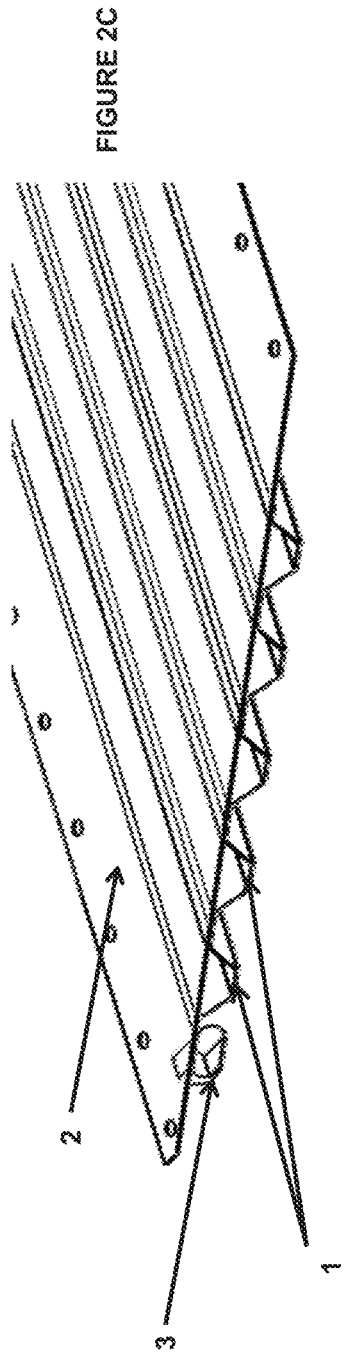
FIGURE 2A
FIGURE 2B
FIGURE 2C

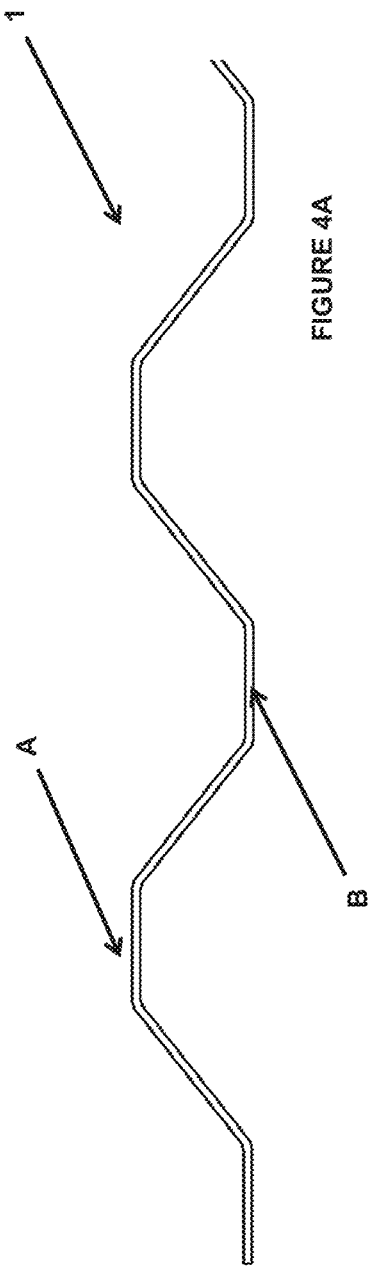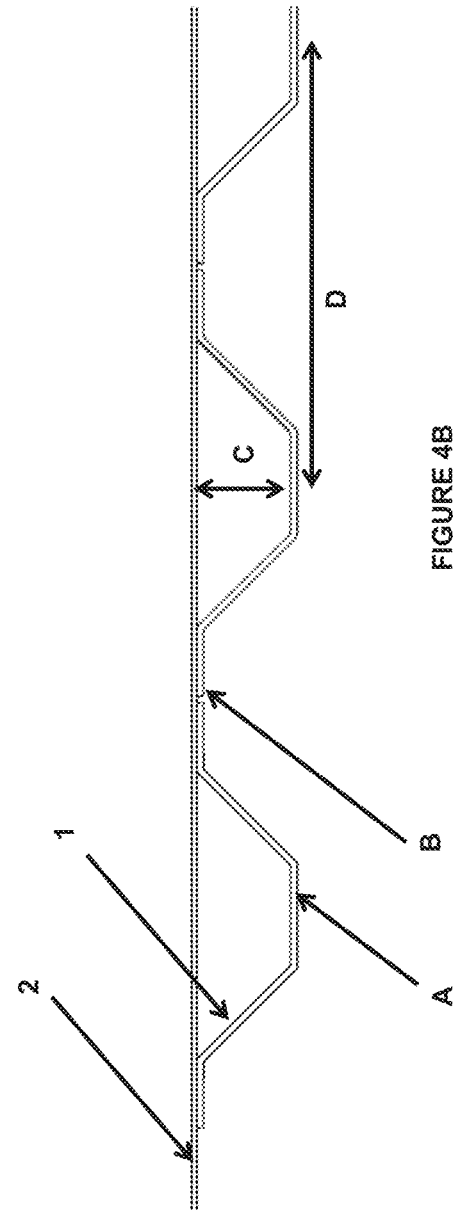

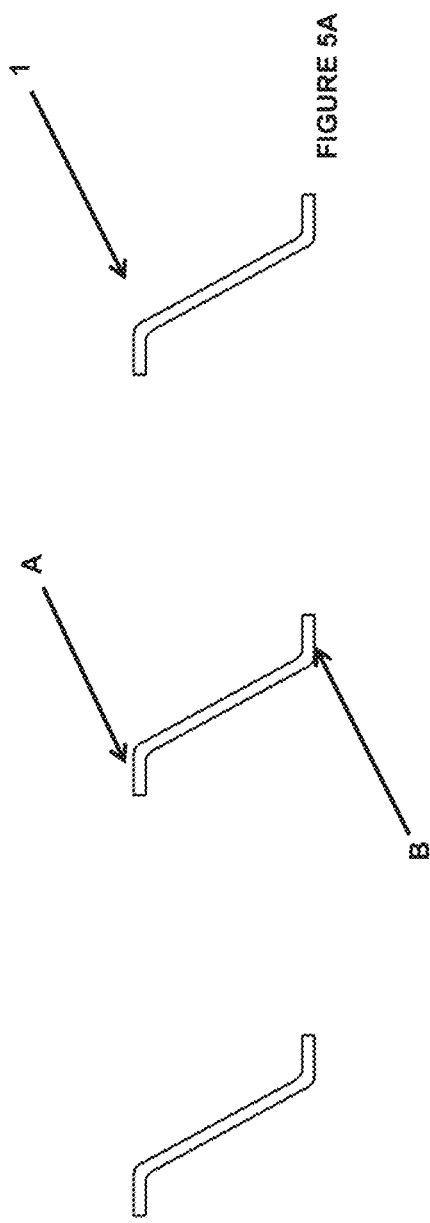
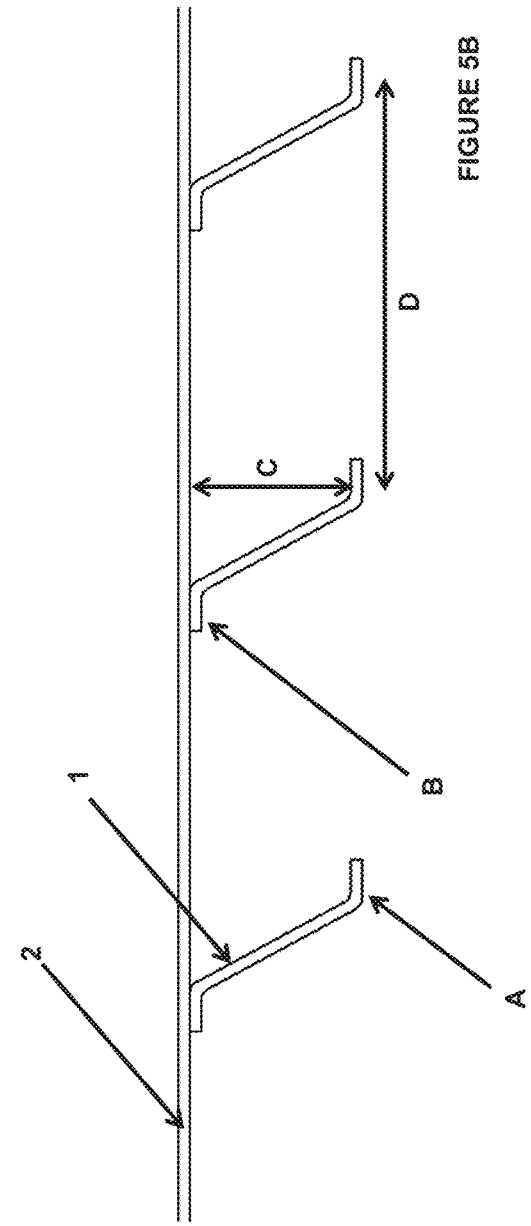

ANODE ASSEMBLY, CONTACT STRIPS, ELECTROCHEMICAL CELL, AND METHODS TO USE AND MANUFACTURE THEREOF

CROSS-REFERENCE TO RELATED APPLICATIONS

This application is a continuation of U.S. patent application Ser. No. 15/605,844, filed May 25, 2017, which application claims benefit to U.S. Provisional Patent Application No. 62/341,941, filed May 26, 2016, and U.S. Provisional Patent Application No. 62/442,163, filed Jan. 4, 2017, which are all incorporated herein by reference in their entirety in the present disclosure.

BACKGROUND

Electrolytic cells contain an anode chamber that contains an anode, a cathode chamber that contains a cathode, and one or more ion exchange membranes such as anion exchange membrane and/or cation exchange membrane interposed between the anode and the cathode. Both the anode and the cathode may contain a series of supports that may be used to mount the anode across the open face of the anode chamber and mount the cathode across the open face of the cathode chamber. Current is injected into the outer surface of the anode chamber which then flows through the anode support bars. After passing through the anode, the membrane, and the cathode, the current flows through the cathode supports bars, and out the back surface of the cathode chamber. The voltage distribution and the resultant current flow from the anode current bars/anode interface to the cathode/cathode current bars interface may impact the performance and reliability of the electrochemical (e.g. chloralkali) cell significantly. Therefore, there is a need for an optimum anode assembly that may result in a uniform current flow across the cell leading to minimized cell voltage and high membrane reliability.

SUMMARY

In one aspect, there is provided an electrochemical cell, comprising a cathode shell, a cathode positioned inside the cathode shell, an anode shell, an anode positioned inside the anode shell, and one or more ion exchange membranes, wherein the one or more ion exchange membranes are disposed between the anode shell and the cathode shell; and a plurality of V-shaped, U-shaped, or Z-shaped elements positioned outside the anode shell and in electrical contact with the anode.

In some embodiments of the foregoing aspect, each of the V-shaped, the U-shaped, or the Z-shaped elements comprises an apex and a base. In some embodiments of the foregoing aspect and embodiment, each of the V-shaped or the U-shaped elements comprises two legs of equal length meeting at the apex. In some embodiments of the foregoing aspect and embodiments, each of the V-shaped or the U-shaped elements comprises two legs of unequal length meeting at the apex. In some embodiments of the foregoing aspect and embodiments, each of the V-shaped, the U-shaped, or the Z-shaped elements is made of a sheet of explosion bonded or laser cladded Ni—Ti (nickel-titanium). In some embodiments of the foregoing aspect and embodiments, each of the bases of the V-shaped, the U-shaped, or the Z-shaped elements is metallurgically attached to the outside of the anode shell bringing it in electrical contact with the anode.

In some embodiments of the foregoing aspect and embodiments, the apexes of the V-shaped, the U-shaped, or the Z-shaped elements comprise conductive contact strips; are coated with nickel, copper, or iron; cladded with nickel, copper, or iron; sprayed with nickel, copper, or iron; bonded with nickel, copper, or iron; or combinations thereof. In some embodiments of the foregoing aspect and embodiments, the conductive contact strips comprise explosion bonded Ni—Ti, explosion bonded Cu—Ti (copper-titanium), laser cladded Cu—Ti, or laser cladded Ni—Ti. In some embodiments of the foregoing aspect and embodiments, the conductive contact strips provide electrical continuity between the anode shell of the electrochemical cell with a cathode shell of an adjacent electrochemical cell when the electrochemical cells are stacked into an electrolyzer.

In one aspect, there is provided an electrochemical cell, comprising a cathode shell, a cathode positioned inside the cathode shell, an anode shell, an anode positioned inside the anode shell, and one or more ion exchange membranes, wherein the one or more ion exchange membranes are disposed between the anode shell and the cathode shell; and a plurality of V-shaped, U-shaped, or Z-shaped elements positioned outside the anode shell, wherein each of the V-shaped, the U-shaped, or the Z-shaped elements comprises an apex and a base, and wherein the apexes of the V-shaped, the U-shaped, or the Z-shaped elements comprise conductive contact strips or wherein the apexes of the V-shaped, the U-shaped, or the Z-shaped elements are coated, cladded, sprayed, or bonded with a conductive metal. In some embodiments, the conductive metal is same as the cathode shell metal including, but not limited to, nickel, copper, or iron such as an iron alloy, e.g. stainless steel.

In some embodiments of the foregoing aspects, the conductive contact strips comprise laser cladded Ni—Ti or Cu—Ti. In some embodiments of the foregoing aspects, the conductive contact strips comprise nickel laser cladded on titanium or copper laser cladded on titanium or vice versa. In some embodiments of the foregoing aspects and embodiment, the conductive contact strips comprise explosion bonded Ni—Ti or Cu—Ti. In some embodiments of the foregoing aspects and embodiments, the conductive contact strips comprises titanium explosion bonded on nickel or nickel explosion bonded on titanium. In some embodiments of the foregoing aspects and embodiments, the U-shaped or the Z-shaped elements have a flat apex. In some embodiments of the foregoing aspects and embodiments, the V-shaped, the U-shaped, or the Z-shaped elements have a flat base. In some embodiments of the foregoing aspects and embodiments, the cathode shell comprises vertical internal current bars and each of the bases of the V-shaped, the U-shaped, or the Z-shaped elements are in an alternate alignment with the vertical internal current bars in the cathode shell so that the current distribution is substantially uniform across the one or more ion exchange membranes.

In some embodiments of the foregoing aspects and embodiments, the plurality of the V-shaped, the U-shaped, or the Z-shaped elements are individual elements or form a sheet. In some embodiments of the foregoing aspects and embodiments, the plurality of the V-shaped, the U-shaped, or the Z-shaped elements provide substantially uniform current distribution. In some embodiments of the foregoing aspects and embodiments, the plurality of the V-shaped, the U-shaped, or the Z-shaped elements enable air flow to provide convective cooling or heating outside the anode shell.

In some embodiments of the foregoing aspects and embodiments, the anode comprises a corrugated porous anode. In some embodiments of the foregoing aspects and embodiments, the apexes of the plurality of the V-shaped, the U-shaped, or the Z-shaped elements are perpendicular to amplitude of corrugation of the corrugated porous anode. In some embodiments of the foregoing aspects and embodiments, the apexes of the plurality of the V-shaped, the U-shaped, or the Z-shaped elements are parallel to amplitude of corrugation of the corrugated porous anode.

In some embodiments of the foregoing aspects and embodiments, the length between the apex and the base of the V-shaped, the U-shaped, or the Z-shaped element is between about 5-30 mm. In some embodiments of the foregoing aspects and embodiments, the distance between the apexes of adjacent V-shaped, adjacent U-shaped, or adjacent Z-shaped elements is between about 5-200 mm. In some embodiments of the foregoing aspects and embodiments, the V-shaped, the U-shaped, or the Z-shaped elements provide a gap of between about 5-50 mm between the anode and the cathode of two adjacent electrochemical cells stacked in the electrolyzer.

In one aspect, there is provided an electrolyzer comprising multiplicity of individual foregoing electrochemical cells.

In one aspect, there is provided an anode assembly, comprising an anode shell; an anode positioned inside the anode shell; and a plurality of V-shaped, U-shaped, or Z-shaped elements positioned outside the anode shell and in electrical contact with the anode. In some embodiments of the foregoing aspect, each of the plurality of the V-shaped, the U-shaped, or the Z-shaped elements comprise an apex and a base; and the apexes comprise conductive contact strips; are coated with nickel, copper, or iron; cladded with nickel, copper, or iron; sprayed with nickel, copper, or iron; bonded with nickel, copper, or iron; or combinations thereof. In some embodiments of the foregoing aspect and embodiments, the conductive contact strips comprise explosion bonded Ni—Ti or laser cladded Ni—Ti.

In one aspect, there is provided a method comprising contacting an anode shell and an anode positioned inside the anode shell, with a cathode shell and a cathode positioned inside the cathode shell in an electrochemical cell; and contacting a plurality of V-shaped, U-shaped, or Z-shaped elements to the outside of the anode shell such that the anode shell is in electrical contact with the plurality of V-shaped, U-shaped, or Z-shaped elements. In some embodiments of the aforementioned aspect, the method further comprises disposing one or more ion exchange membranes between the anode shell and the cathode shell.

In some embodiments of the foregoing aspect, each of the V-shaped, the U-shaped, or the Z-shaped elements comprises an apex and a base. In some embodiments of the foregoing aspect and embodiment, each of the V-shaped or the U-shaped elements comprises two legs of equal length meeting at the apex. In some embodiments of the foregoing aspect and embodiment, each of the V-shaped or the U-shaped elements comprises two legs of unequal length meeting at the apex.

In some embodiments of the foregoing aspect and embodiments, the method further comprises metallurgically attaching each of the bases of the V-shaped, the U-shaped, or the Z-shaped elements to the outside of the anode shell thereby bringing it in electrical contact with the anode.

In some embodiments of the foregoing aspect and embodiments, the method further comprises providing conductive contact strips on the apexes of the V-shaped, the U-shaped, or the Z-shaped elements; or coating, spraying, bonding, or cladding the apexes of the V-shaped, the U-shaped, or the Z-shaped elements with conductive metal e.g. nickel, copper, or iron such as an iron alloy. In some embodiments of the foregoing aspect and embodiments, the method further comprises laser cladding nickel or copper on titanium or explosion bonding nickel or copper to titanium to form the conductive contact strips.

In some embodiments of the foregoing aspect and embodiments, the method further comprises providing electrical continuity through the conductive contact strips, between the anode shell of the electrochemical cell with a cathode shell of an adjacent electrochemical cell when the electrochemical cells are stacked in an electrolyzer.

In some embodiments of the foregoing aspect and embodiments, the method further comprises manufacturing the plurality of V-shaped, U-shaped, or Z-shaped elements by explosion bonding or laser cladding nickel and titanium to form Ni—Ti sheets and configuring the Ni—Ti sheets to form the plurality of V-shaped, U-shaped, or Z-shaped elements.

In some embodiments of the foregoing aspect and embodiments, the method further comprises providing vertical internal current bars inside the cathode shell. In some embodiments of the foregoing aspect and embodiments, the method further comprises aligning each of the bases of the V-shaped, the U-shaped, or the Z-shaped elements in an alternate alignment with the vertical internal current bars and providing substantially uniform current distribution across the one or more ion exchange membranes. In some embodiments of the foregoing aspect and embodiments, providing substantially uniform current distribution in the electrochemical cell through the plurality of the V-shaped, the U-shaped, or the Z-shaped elements.

In some embodiments of the foregoing aspect and embodiments, enabling air flow to provide convective cooling or heating outside the anode shell through the plurality of the V-shaped, the U-shaped, or the Z-shaped elements.

In some embodiments of the foregoing aspect and embodiments, the anode comprises a corrugated porous anode having amplitude of corrugation. In some embodiments of the foregoing aspect and embodiments, the method further comprises contacting the plurality of the V-shaped, the U-shaped, or the Z-shaped elements to the outside of the anode shell such that the apexes of the elements are perpendicular to the amplitude of corrugation of the corrugated porous anode. In one aspect, there is provided a method, comprising providing a V-shaped, U-shaped, or Z-shaped element, wherein the V-shaped, the U-shaped, or the Z-shaped element comprises an apex and a base, and wherein the V-shaped, U-shaped, or Z-shaped element is made of titanium; and attaching a Ni—Ti or Cu—Ti conductive contact strip to the apex of the V-shaped, U-shaped, or Z-shaped element; or coating, cladding, spraying, or bonding nickel or copper on titanium apex of the V-shaped, U-shaped, or Z-shaped element. In some embodiments of the aforementioned aspect, there are provided a plurality of the V-shaped, U-shaped, or Z-shaped elements.

In some embodiments of the aforementioned aspects and embodiments, the coating comprises electroless or electrolytic coating process.

In some embodiments of the aforementioned aspects, the cladding comprises laser cladding process. In some embodiments of the aforementioned aspect and embodiment, the method further comprises depositing Ni or Cu on the Ti apex of the V-shaped, U-shaped, or Z-shaped element in the laser cladding process to form a Ni—Ti or Cu—Ti conductive contact strip on the apex of the V-shaped, U-shaped, or Z-shaped element. In some embodiments of the aforementioned aspect and embodiment, the method further comprises milling the strip to flatten surface of the conductive contact strip. In some embodiments of the aforementioned aspect and embodiments, the depositing step is done while destroying or removing oxide layer from Ti apex. In some embodiments of the aforementioned aspect and embodiments, the depositing of Ni or Cu comprises depositing Ni or Cu powder or metal wire on the Ti apex. In some embodiments, the powder or the metal wire further comprises alumina to destroy or remove oxide layer from Ti.

In some embodiments of the aforementioned aspect and embodiments, the method further comprises destroying or removing oxide layer from the Ti apex before the laser cladding process by sand blasting, mechanical abrasion, treatment with alumina, or acid pickling.

In some embodiments of the aforementioned aspect and embodiments, the method further comprises keeping the Ti apex of the V-shaped, U-shaped, or Z-shaped element in inert atmosphere until subjecting the Ti apex to the laser cladding process.

In some embodiments of the aforementioned aspect and embodiment, the spraying comprises an additive process such as but not limited to, chemical vapor deposition process (CVD) or cold spray deposition.

In some embodiments of the aforementioned aspect and embodiment, the bonding comprises explosion bonding process.

In one aspect, there is provided a process for manufacturing an anode assembly, comprising attaching a plurality of V-shaped, U-shaped, or Z-shaped elements positioned outside an anode shell; and attaching an anode inside the anode shell.

In some embodiments of the foregoing aspects, the process comprises metallurgically attaching the anode to the inside of the anode shell.

In some embodiments of the foregoing aspects, the process comprises metallurgically attaching the plurality of the V-shaped, the U-shaped, or the Z-shaped elements outside the anode shell such that the plurality of the V-shaped, the U-shaped, or the Z-shaped elements are in electrical contact with the anode.

In some embodiments of the foregoing aspect and embodiments, each of the plurality of the V-shaped, the U-shaped, or the Z-shaped elements comprise an apex and a base and each of the bases of the plurality of the V-shaped, the U-shaped, or the Z-shaped elements are attached outside the anode shell.

In some embodiments of the foregoing aspect and embodiments, the process further comprising providing conductive contact strips on the apexes of the V-shaped, the U-shaped, or the Z-shaped elements; or coating, bonding, spaying, or laser cladding the apexes of the V-shaped, the U-shaped, or the Z-shaped elements with nickel or copper, before or after the attaching step.

In one aspect, there is provided a process for manufacturing an electrochemical cell, comprising assembling an individual electrochemical cell by joining together the anode assembly of any of the foregoing embodiments with a cathode assembly comprising a cathode shell and a cathode; placing the anode assembly and the cathode assembly in parallel and separating them by one or more ion exchange membranes; and supplying the electrochemical cell with feeders for a cell current and an electrolysis feedstock. In some embodiments of the foregoing aspect, the process further comprises reciprocally fastening the anode assembly, the cathode assembly, and the one or more ion exchange membranes by peripheral bolting.

In one aspect, there is provided a process for assembling an electrolyzer, comprising assembling foregoing individual electrochemical cells; and placing a plurality of the assembled electrochemical cells side by side in a stack and bracing them together so as to sustain electrical contact between the electrochemical cells. In some embodiments of the foregoing aspects, the electrical contact between the anode shell of one electrochemical cell and the cathode shell of the adjacent electrochemical cell is through the conductive contact strips on the apexes of the V-shaped, the U-shaped, or the Z-shaped elements positioned outside the anode shell; or through coated, laser cladded, sprayed, or explosion bonded nickel or copper on the apexes of the V-shaped, the U-shaped, or the Z-shaped elements.

In one aspect, there is provided a process for manufacture of Ni—Ti or Cu—Ti conductive contact strip for electrochemical cell comprising: depositing Ni or Cu on surface of a Ti strip or depositing Ti on surface of a Ni or Cu strip by laser cladding process to obtain a Ni—Ti or Cu—Ti conductive contact strip for an electrochemical cell. In some embodiments of the aforementioned aspect, the process further comprises providing a longitudinal slot in a central part of the Ni—Ti or Cu—Ti conductive contact strip to form two strips of Ni or Cu and exposing a Ti surface of the Ti strip. In some embodiments of the aforementioned aspect and embodiment, the process further comprises milling the strip to flatten surface of the conductive contact strip. In some embodiments of the aforementioned aspect and embodiments, the depositing the Ni or Cu comprises depositing Ni powder, Ni metal wire, Cu powder, or Cu metal wire or depositing the Ti comprises depositing Ti powder or Ti metal wire.

In some embodiments of the aforementioned aspect and embodiments, the depositing Ni or Cu step is done while destroying or removing oxide layer from Ti strip. In some embodiments of the aforementioned aspect and embodiments, the Ni or Cu powder or metal wire further comprises alumina to destroy or remove oxide layer from Ti. In some embodiments of the aforementioned aspect and embodiments, the process further comprises destroying or removing oxide layer from the Ti surface of the Ti strip before the depositing Ni or Cu step by sand blasting, mechanical abrasion, treatment with alumina, or acid pickling. In some embodiments of the aforementioned aspect and embodiments, the process further comprises keeping the Ti strip in inert atmosphere until subjecting the Ti strip to the laser cladding process. In some embodiments of the aforementioned aspect and embodiments, the process further comprises attaching the Ni—Ti or Cu—Ti conductive contact strip to an anode shell of an electrochemical cell. In some embodiments of the aforementioned aspect and embodiments, the process further comprises attaching the Ni—Ti or Cu—Ti conductive contact strip to an apex of a V-shaped, U-shaped, or Z-shaped element attached to the anode shell.

In one aspect, there is provided a method of establishing an electrical contact between adjacent electrochemical cells in an electrolyzer, the method comprising:

obtaining a Ni—Ti or Cu—Ti conductive contact strip by depositing Ni or Cu on surface of a Ti strip or depositing Ti on surface of Ni or Cu strip by laser cladding process to form Ni—Ti or Cu—Ti conductive contact strip and providing a longitudinal slot in a central part of the Ni—Ti or Cu—Ti conductive contact strip to form two strips of Ni or Cu and exposing a Ti surface of the Ti strip, thereby obtaining a Ni—Ti or Cu—Ti conductive contact strip for the electrochemical cell; attaching the Ni—Ti or Cu—Ti conductive contact strip to an anode shell of an electrochemical cell by welding the exposed Ti surface of the Ti strip to the anode shell, wherein the anode shell is made of Ti; and establishing an electrical contact between adjacent electrochemical cells in the electrolyzer by contacting the anode shell of the electrochemical cell with a cathode shell of an adjacent electrochemical cell via the two strips of Ni or Cu in the Ni—Ti or Cu—Ti conductive contact strip.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

FIG. 1 illustrates some embodiments related to the electrochemical cell.

FIGS. 2A-2C are an illustration of some embodiments related to the plurality of the U-shaped elements and the anode shell attached to the same.

FIGS. 4A and 4B illustrate some embodiments related to the U-shaped elements and the anode shell attached to the same.

FIGS. 5A and 5B illustrate some embodiments related to the Z-shaped elements and the anode shell attached to the same.

DETAILED DESCRIPTION

Figure 3A:
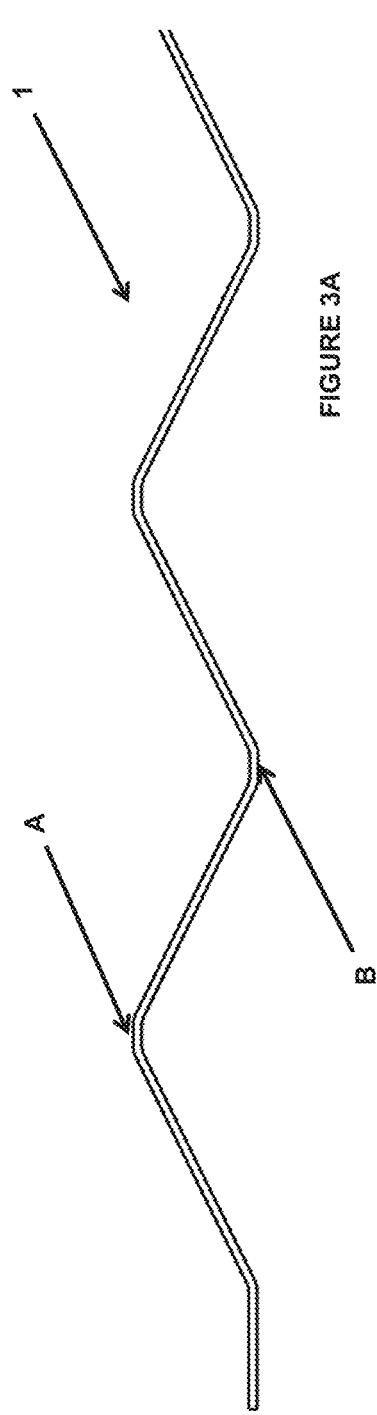
FIGS. 3A and 3B illustrate some embodiments related to the V-shaped elements and the anode shell attached to the same.

Disclosed herein is an anode assembly, conductive contact strips, electrochemical cells comprising the anode assembly and the conductive contact strips, and methods and processes of using, assembling, and manufacturing the same.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges that are presented herein with numerical values may be construed as "about" numericals. The "about" is to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Anode Assembly, Conductive Contact Strips, Electrochemical Cells, and Methods

In a typical electrochemical cell, there is an anode chamber that houses an anode and an anode electrolyte. There is a cathode chamber that houses a cathode and a cathode electrolyte and the anode chamber and the cathode chamber are separated by one or more ion exchange membranes (IEM). The IEM may be an anion exchange membrane (AEM), a cation exchange membrane (CEM), or both depending on the desired reactions at the anode and the cathode. In between these components, various additional separator components may be provided to separate, e.g. the AEM from the anode, the CEM from the cathode and/or AEM from the CEM as well as provide mechanical integrity to the membranes. In addition to these components, individual gaskets or gasket tape may be provided in between and along the outer perimeter of the components to seal the compartments from fluid leakage. In some electrolyzers, the electrochemical system includes the anode and the cathode separated by both the AEM and the CEM creating a third chamber in the middle containing the electrolyte.

In an illustrative embodiment, the electrochemical cell is shown in FIG. 1. As illustrated in FIG. 1, the cell houses an anode electrode assembly and a cathode electrode assembly. The anode electrode assembly comprises an anode shell and an anode therein. The cathode electrode assembly comprises a cathode shell and a cathode therein. The two chambers are separated by the one or more ion exchange membranes such as the AEM and/or the CEM disposed between the anode assembly and the cathode assembly. In embodiments where both the AEM and the CEM are present (not shown in FIG. 1), between the AEM and the CEM may be an intermediate frame that forms an intermediate chamber for feeding the electrolyte in the cell. Gaskets may be present around the cell's active area in order to form liquid seals. Separators, woven or unwoven, may be present to prevent the membranes from touching each other. Many such combinations are possible and are within the scope of the invention. All the components described above may be aligned parallel to each other and optional peripheral bolting may be provided to stack them together in the electrochemical cell. In filter press configuration, no peripheral bolting may be required. In a stack of electrochemical cells, the anode of one electrochemical cell is in contact with the cathode of the adjacent electrochemical cell. The current passes through the stack of electrochemical cells during operation.

In a typical cell, a series of vertical support bars may be used to mount the anode across the anode shell. A second series of vertical support bars may be used to mount the cathode across the cathode shell. In addition to providing mechanical support for the electrodes, the supports may also provide current path through the cell. The current may be injected into the outer surface of the anode shell. It may then flow through the anode support bars. After passing through the anode, the membrane, and the cathode; the current may flow through the cathode supports bars, and out the back surface of the cathode shell.

The voltage distribution and resultant current flow from anode current bars/anode interface to cathode/cathode current bars interface may impact the performance and reliability of the electrochemical cells. For example, due to the vertical support bars, variable thickness gaps between the membrane and the two electrodes may get distributed across the active area leading to the formation of pockets of the anolyte and/or the catholyte. Each pocket of the anolyte (catholyte) between the anode (cathode) and the membrane may comprise a resistance to current flow. The net effect may be a concentration of current through the low-resistance regions, and a reduction of current in the high-resistance regions (fluid pockets). The resultant non-uniform current distribution may drive the overall cell voltage upward. This non-uniform current distribution may also lead to regions of relatively high current density which can damage membranes due to joule or resistance heating.

Provided herein is a unique anode assembly for the electrochemical cell that enhances current distribution in the electrochemical cell and reduces or prevents harmful effects of current concentration such as, but not limited to, higher voltage, damage to membrane(s) in the electrochemical cell, etc.

The anode assembly provided herein comprises a plurality of corrugated elements attached to the outside of the anode shell which are in electrical contact with the anode. The corrugated elements may be of any desired shape, few of which have been described herein. In one aspect, there is a provided an anode shell comprising a plurality of V-shaped, U-shaped, Z-shaped elements or combinations thereof positioned outside the anode shell. The "V-shape, the U-shape, and the Z-shape" used herein, are different geometries of the elements that are attached to the outside of the shell. It is to be understood that variation of these geometries such as softened or rounded edges of the shapes such as inverted S-shape (same as Z-shape but softened edges) or slight U-shape (softened or rounded V-shape); sharpened edges such as U-shape with sharpened edges or corners instead of rounded edges; or other shapes similar to the V-shape, U-shape, or Z-shape such as W-shape (same as two V-shapes joined together), etc. are all within the scope of the invention.

In some embodiments of this aspect, the anode shell further comprises an anode attached inside the anode shell where the plurality of the V-shaped, the U-shaped, the Z-shaped elements, or combinations thereof are in electrical contact with the anode. The attachment of the V-shaped, the U-shaped or the Z-shaped elements to the outside of the anode shell and the attachment of the anode to the inside of the anode shell is such that the elements are in direct electrical contact with the anode (described in detail herein). Accordingly, there is provided an anode assembly, comprising an anode shell; an anode positioned or attached inside the anode shell; and a plurality of V-shaped, U-shaped, Z-shaped elements, or combinations thereof positioned outside the anode shell and in electrical contact with the anode.

An illustrative embodiment of an anode shell is provided in FIGS. 2A-C. An isometric view of the anode shell is illustrated in FIGS. 2A and 2B, where the U-shaped elements 1 are positioned on the outside of the anode shell or a base sheet 2. There are manifolds 3 attached on either side of the anode shell for anolyte or anode electrolyte to flow inside the anode shell in the anode chamber. Since the V-shaped, the U-shaped, or the Z-shaped elements are outside the anode shell, no anolyte flows through the elements. A side-view of the anode shell is illustrated in FIG. 2C. While the U-shaped elements are positioned outside the anode shell, the anode is positioned inside the anode shell and is in contact with the anode electrolyte (anode is not illustrated in FIGS. 2A-C). FIG. 2A illustrates an embodiment where the U-shaped elements are individual elements. In some embodiments, the V-shaped, the U-shaped, and the Z-shaped elements are in a form of a sheet containing any number of the V-shaped, the U-shaped, and the Z-shaped elements. In some embodiments, the V-shaped, the U-shaped, and the Z-shaped elements are individual pieces of the elements. The V-shaped, the U-shaped, and the Z-shaped elements are illustrated in FIGS. 3A-B, FIGS. 4A-B, and FIGS. 5A-B, respectively. The V-shaped, U-shaped, and the Z-shaped elements are made from an electro conductive material such as, but not limited to, titanium, titanium alloys, stainless steel, stainless steel alloys, inconel, hastelloy, and the like.

Figure 3B:
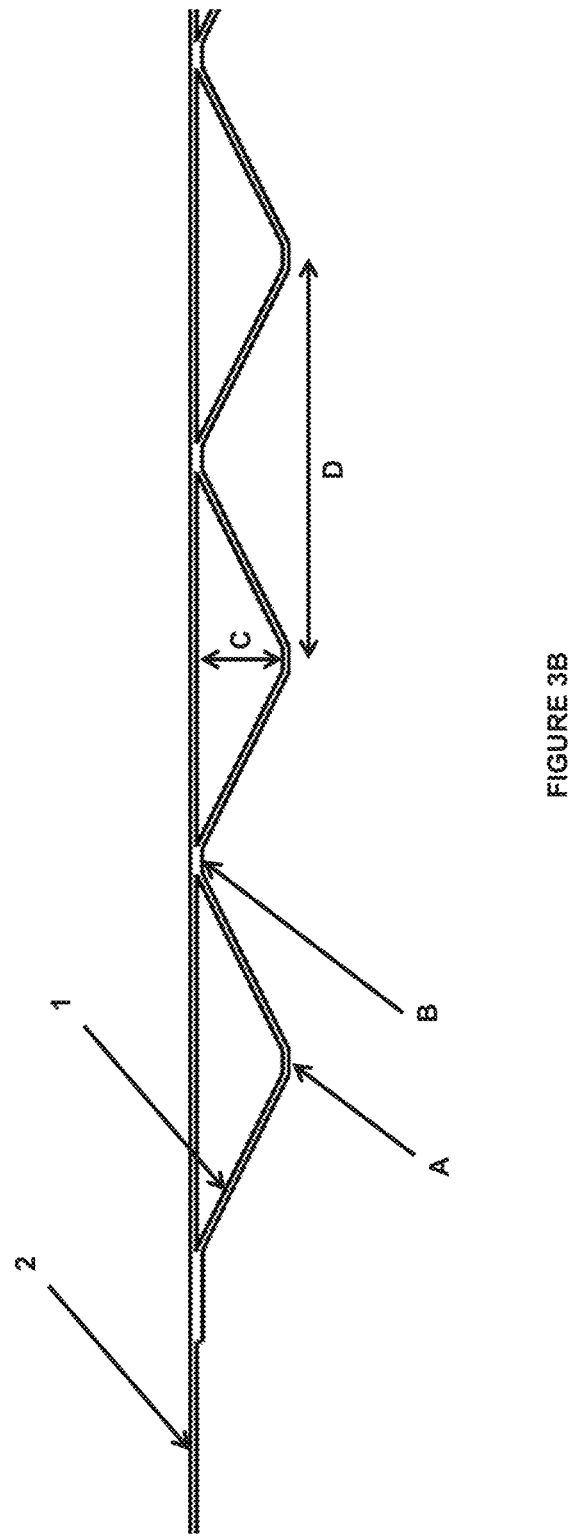

It is to be understood that FIGS. 3A-B, FIGS. 4A-B, and FIGS. 5A-B are illustrations of the geometries of the elements and are in no way limiting to the thickness, proportion, or orientation of the elements. For example, FIGS. 2A-C illustrate five U-shaped elements attached to the anode shell. However, any desired number of the individual V-shaped, the U-shaped, and the Z-shaped elements may be attached to the anode shell or the sheet containing the elements may have any number of the desired V-shaped or U-shaped or Z-shaped elements in it. Any other shape resembling the V-shaped, the U-shaped, or the Z-shaped elements is well within the scope of the invention. FIG. 3A illustrates a sheet of the V-shaped elements 1 while FIG. 3B illustrates a sheet of the V-shaped elements 1 attached to the anode shell 2. FIG. 4A illustrates a sheet of the U-shaped elements 1 while FIG. 4B illustrates a sheet of the U-shaped elements 1 attached to the anode shell 2. The U-shape is illustrated with a slightly expanded or stretched U-shape; however, other variations of the U shape including the one with a straight U (no expansion or stretch) are well within the scope of the invention. FIG. 5A illustrates the Z-shaped elements 1 while FIG. 5B illustrates the Z-shaped elements 1 attached to the anode shell 2. In some embodiments, the V-shaped, the U-shaped, or the Z-shaped elements may be attached to a separate sheet before attaching the sheet to the anode shell.

In some embodiments of the aspects and embodiments provided herein, each of the V-shaped, the U-shaped, or the Z-shaped elements comprises an apex A and a base B, as illustrated in FIGS. 3A-B, FIGS. 4A-B, and FIGS. 5A-B, respectively. In some embodiments of the aspects and embodiments provided herein, each of the V-shaped or the U-shaped elements comprises two legs meeting at the apex. The two legs may be symmetrical and have equal lengths or the two legs may be unsymmetrical and may be of unequal lengths. In some embodiments of the aspects and embodiments provided herein, each of the V-shaped or the U-shaped elements comprises two legs of equal length meeting at the apex. In some embodiments of the aspects and embodiments provided herein, each of the V-shaped or the U-shaped elements comprises two legs of unequal length meeting at the apex. In some embodiments of the aspects and embodiments provided herein, the U-shaped or the Z-shaped elements have a flat apex. It is to be understood that in some embodiments, the U-shaped element may not have a flat apex and is a curved U-shaped apex. In some embodiments, the apexes of the elements provide a site for attaching conductive contact strips or coating, cladding, spraying, or bonding a conductive metal such as, but not limited to, nickel, copper, iron, etc. (described in detail further herein). In some embodiments of the aspects and embodiments provided herein, the V-shaped or the U-shaped or the Z-shaped elements have a flat base. The V-shaped or the U-shaped or the Z-shaped elements provided herein, are attached to the anode shell using the flat base of the elements. In embodiments, where the V-shaped or the U-shaped or the Z-shaped elements are in a form of a sheet, the base of the elements is used to attach the sheet of the elements to the anode shell. In some embodiments of the aspects and embodiments provided herein, each of the bases of the V-shaped, the U-shaped, or the Z-shaped elements is metallurgically attached to the outside of the anode shell bringing it in electrical contact with the anode. The "metallurgical" or grammatical equivalent thereof, used herein includes any metallurgical technique to attach the elements or the anode to the anode shell. Examples of such techniques have been provided herein. In some embodiments of the aspects and embodiments provided herein, each of the bases of the V-shaped, the U-shaped, or the Z-shaped elements is metallurgically attached to the outside of the anode shell and the anode is metallurgically attached to the inside of the anode shell thereby bringing the V-shaped, the U-shaped, or the Z-shaped elements in electrical contact with the anode.

While the V-shaped or the U-shaped or the Z-shaped elements can be of any desired length and width, in some embodiments of the aspects described herein, the length (illustrated as C in FIGS. 3A-B, FIGS. 4A-B, and FIGS. 5A-B) between the apex and the base of the V-shaped, the U-shaped, or the Z-shaped element is between about 5-30 mm. In some embodiments, the length between the apex and the base of the V-shaped, the U-shaped, or the Z-shaped element is between about 5-30 mm; or between about 5-25 mm; or between about 5-20 mm; or between about 5-15 mm; or between about 5-10 mm; or between about 5-8 mm; or between about 10-30 mm; or between about 10-25 mm; or between about 10-20 mm; or between about 10-15 mm; or between about 15-30 mm; or between about 15-25 mm; or between about 15-20 mm; or between about 20-30 mm; or between about 20-25 mm. For example, in some embodiments, the length between the apex and the base of the V-shaped, the U-shaped, or the Z-shaped element is between about 10-30 mm, or between about 15-30 mm, or between about 20-30 mm.

In some embodiments of the aspects provided herein, the distance (illustrated as D in FIGS. 3A-B, FIGS. 4A-B, and FIGS. 5A-B) between the apexes of adjacent V-shaped, adjacent U-shaped, or adjacent Z-shaped elements is between about 5-200 mm or between about 30-150 mm. In embodiments where the apex may be flat (e.g. in the U-shaped and the Z-shaped elements), the distance between the apexes is from the center of the first apex to the center of the adjacent apex. In some embodiments, the distance between the apexes of the adjacent V-shaped, the adjacent U-shaped, or the adjacent Z-shaped element is between about 5-200 mm; or between about 5-150 mm; or between about 5-100 mm; or between about 5-75 mm; or between about 5-50 mm; or between about 30-150 mm; or between about 30-125 mm; or between about 30-100 mm; or between about 30-75 mm; or between about 30-50 mm; or between about 50-150 mm; or between about 50-125 mm; or between about 50-100 mm; or between about 50-75 mm; or between about 75-150 mm; or between about 75-125 mm; or between about 75-100 mm; or between about 100-150 mm; or between about 100-125 mm; or between about 125-150 mm. For example, in some embodiments, the distance between the apexes of the adjacent V-shaped, the adjacent U-shaped, or the adjacent Z-shaped element is between about 50-150 mm, or between about 75-150 mm, or between about 100-150 mm, or between about 125-150 mm, between about 50-75 mm, between about 50-100 mm.

Each of the apexes of the V-shaped, the U-shaped, or the Z-shaped elements attached on the anode shell of the electrochemical cell can provide region of electrical contact for the current to distribute to the anode and further to the one or more ion exchange membranes and the cathode of the electrochemical cell. Each of the apexes of the V-shaped, the U-shaped, or the Z-shaped elements on the anode shell of the electrochemical cell can also provide region of electrical contact for the current distribution with the cathode shell of an adjacent electrochemical cell when the electrochemical cells are stacked together in an electrolyzer containing multiplicity of individual electrochemical cells.

In a typical operation, cells may be arranged anode-to-cathode in a large linear array in the electrolyzer. If a low contact resistance pathway is not provided across the array, the ohmic losses (voltage gains) across the interfaces may be large. The anode and the cathode shells are made of a conductive metal. The "conductive metal" as used herein, includes any conductive metal suitable to be used as an anode shell or the cathode shell. For example, in some embodiments, the anode shell and the V-shaped, the U-shaped, or the Z-shaped elements are made of a conductive metal such as, but not limited to, titanium, titanium alloys, stainless steel, stainless steel alloys, inconel, hastelloy, and the like and the cathode shell is made of a conductive metal such as, but not limited to, nickel (Ni), copper (Cu), iron (Fe), silver, gold, aluminum, brass/bronze, carbon, any platinum group metal, engineered conductive plastics, or any alloy thereof.

Titanium (Ti) of the anode shell may rapidly form a tenacious, high-resistance oxide coating when exposed to air. The electrical contact resistance between e.g. Ti of the anode side of one electrochemical cell with the Ni of the cathode side of another electrochemical cell in an electrolyzer may be high. The electrical contact resistance across e.g. a Ni—Ni or Cu—Ni mechanical contact may be significantly less than the resistance across a Ti—Ni mechanical interface.

In some embodiments of the aspects and embodiments provided herein, the anode assembly design provided herein achieves the desired nickel-nickel (Ni—Ni) or iron-iron (Fe—Fe) or copper-copper (Cu—Cu) or copper-nickel (Cu—Ni) contact between the anodes (e.g. made of Ti), and the adjacent cathodes (e.g. made of Ni or Fe or Cu) in a linear array of the electrochemical cells by using conductive contact strips of Ni—Ti, Cu—Ti, or Fe—Ti (with Ti interfacing towards the anode side and Cu, Ni, or Fe interfacing towards the cathode side). In some embodiments, instead of attaching the conductive contact strips on the apexes of the elements, the Ti apexes of the elements are coated with nickel, copper, or iron; or cladded with nickel, copper, or iron; or sprayed with nickel, copper, or iron; or bonded with nickel, copper, or iron.

The "conductive contact strip" as used herein includes strip of one or more conductive metals. The conductive contact strip may be used to interface anode shell of an electrochemical cell on one side and cathode shell of an adjacent electrochemical cell on the other side thereby providing electrical continuity between the electrochemical cells in an electrolyzer. Few examples of the conductive metals are described above. In some embodiments of the aspects and embodiments provided herein, the apexes of the V-shaped, the U-shaped, or the Z-shaped elements comprise conductive contact strips; or are coated with nickel, copper, or iron; cladded with nickel, copper, or iron; sprayed with nickel, copper, or iron; or bonded with nickel, copper, or iron; or combinations thereof. The techniques for making conductive contact strips or the techniques of coating, cladding, spraying, or bonding have been provided herein.

In some embodiments of the aspects and embodiments provided herein, the conductive contact strips comprise explosion bonded or laser cladded Ni—Ti, Fe—Ti, or Cu—Ti. The "Ni—Ti" or "Ti—Ni" used herein includes nickel-titanium layer. The "Cu—Ti" or "Ti—Cu" used herein includes copper-titanium layer. The "Fe—Ti" or "Ti—Fe" used herein includes iron-titanium layer. The "iron" or "Fe" as used herein includes iron or iron alloy such as, but not limited to, stainless steel. The conductive contact strips may be any cathode metal sprayed, coated, bonded or cladded with anode metal to form two layers of metal in contact with each other such as, e.g. Ni—Ti or Cu—Ti or iron-Ti or stainless steel-Ti, etc. In some embodiments, the cladding is laser cladding. In some embodiments of the aspects and embodiments provided herein, the conductive contact strips provide electrical continuity between the anode shell of the electrochemical cell with a cathode shell of an adjacent electrochemical cell when the electrochemical cells are stacked in an electrolyzer.

In some embodiments of the aspects and embodiments provided herein, the apexes of the V-shaped, the U-shaped, or the Z-shaped elements are directly coated with nickel, copper or iron/iron alloy such as stainless steel. In some embodiments, the coating process is electroless where nickel, copper, or iron/iron alloy such as stainless steel may be coated on the apexes of the elements. In some embodiments, the coating process is electrolytic where nickel, copper, or iron/iron alloy such as stainless steel may be coated on the apexes of the elements electrolytically.

In some embodiments of the aspects and embodiments provided herein, the apexes of the V-shaped, the U-shaped, or the Z-shaped elements are sprayed with nickel, copper or iron/iron alloy such as stainless steel. In some embodiments, the spraying process is an additive process such as, but not limited to, chemical vapor deposition (CVD) or cold spray deposition.

In some embodiments of the aspects and embodiments provided herein, the apexes of the V-shaped, the U-shaped, or the Z-shaped elements comprise conductive contact strips comprising laser cladded nickel, copper, or iron on titanium or each of the apexes are directly laser cladded with nickel, copper, or iron.

In some embodiments of the aspects and embodiments provided herein, the entire U, V or Z-shaped elements are directly made out of explosion bonded or laser cladded Ti—Ni, Fe—Ti or Cu—Ti sheet so that no conductive strips or coating with nickel or copper or iron is needed.

Figure 6:
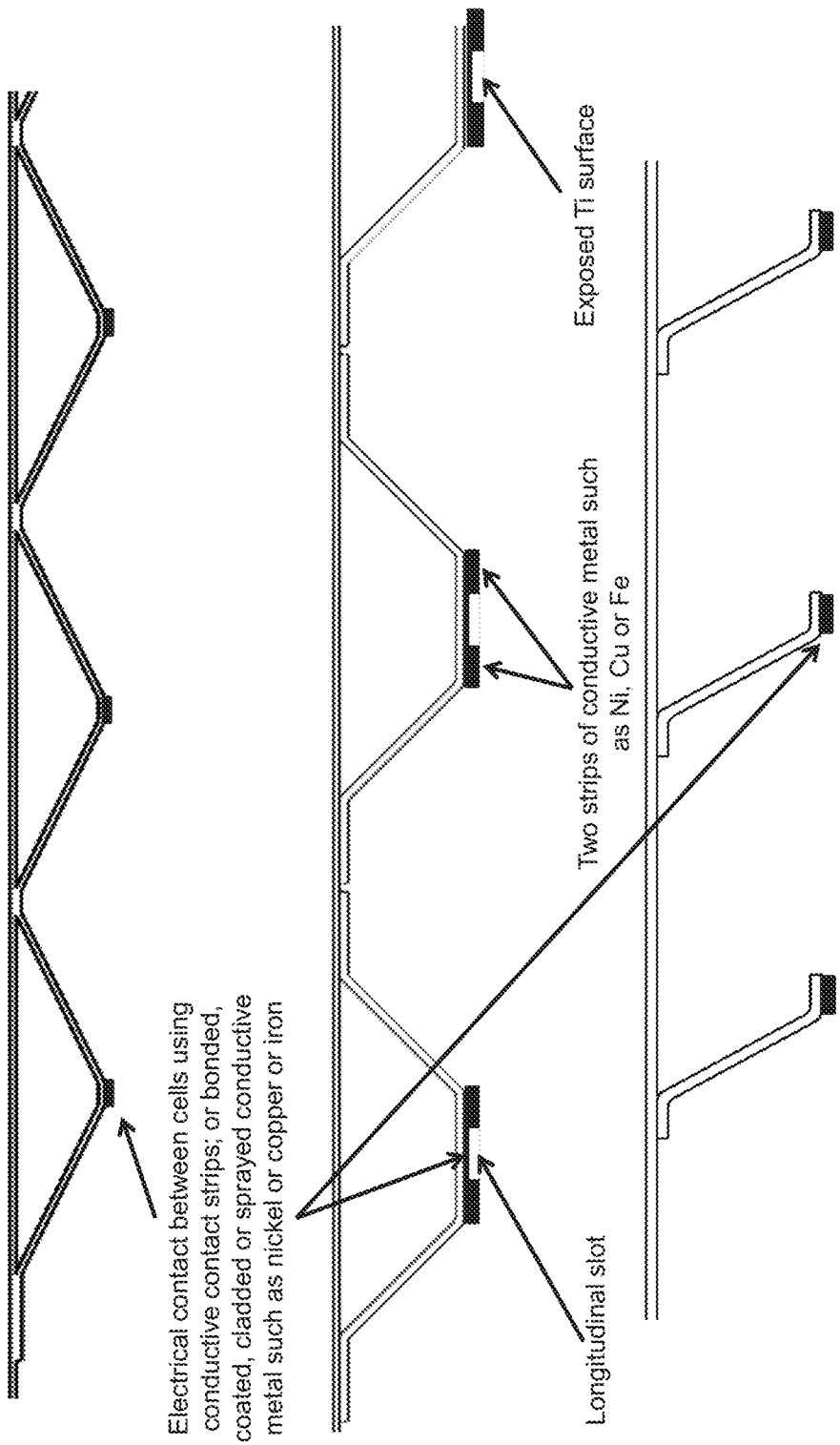
FIG. 6 illustrates some embodiments related to the V-shaped, the U-shaped, or the Z-shaped elements with the conductive contact strips; or bonded, coated, sprayed, or cladded conductive metal, such as, nickel or copper.

An illustration of the conductive contact strips (formed by cladding such as laser cladding or bonding such as explosion bonding); or coating, bonding, cladding, or spraying of the apexes of the elements with the conductive metal is shown in FIG. 6. As illustrated, the apexes of the V-shaped, the U-shaped, or the Z-shaped elements may be coated, bonded, cladded or sprayed with nickel or copper or iron (or any other metal that the cathode shell is made of); or may have conductive contact strips attached to the apexes of the elements, formed by explosion bonding or laser cladding of the titanium with nickel, copper, or iron. It is not necessary for all the apexes of all the V-shaped, the U-shaped, or the Z-shaped elements attached to the anode shell to contain the conductive contact strips, or to be coated, bonded, cladded, or sprayed with the conductive metal. Sufficient number of apexes may contain the conductive contact strips or are coated, bonded, cladded or sprayed with the conductive metal such that a uniform current distribution is established.

In some embodiments of the aspects and embodiments provided herein, the anode assembly comprises the anode shell; an anode positioned inside the anode shell; and the plurality of V-shaped, U-shaped, or Z-shaped elements positioned outside the anode shell and in electrical contact with the anode, wherein the anode is a corrugated porous anode. In some embodiments of the aspects and embodiments provided herein the anode is a flat mesh anode and a corrugated porous anode. The anode shell comprising the plurality of the V-shaped, the U-shaped, or the Z-shaped elements positioned outside the shell, as described in the foregoing aspects and embodiments, is then attached to the anode on the inside of the anode shell. An illustration of the alignment of the anode shell with the anode is as illustrated in FIG. 7.

Figure 7:
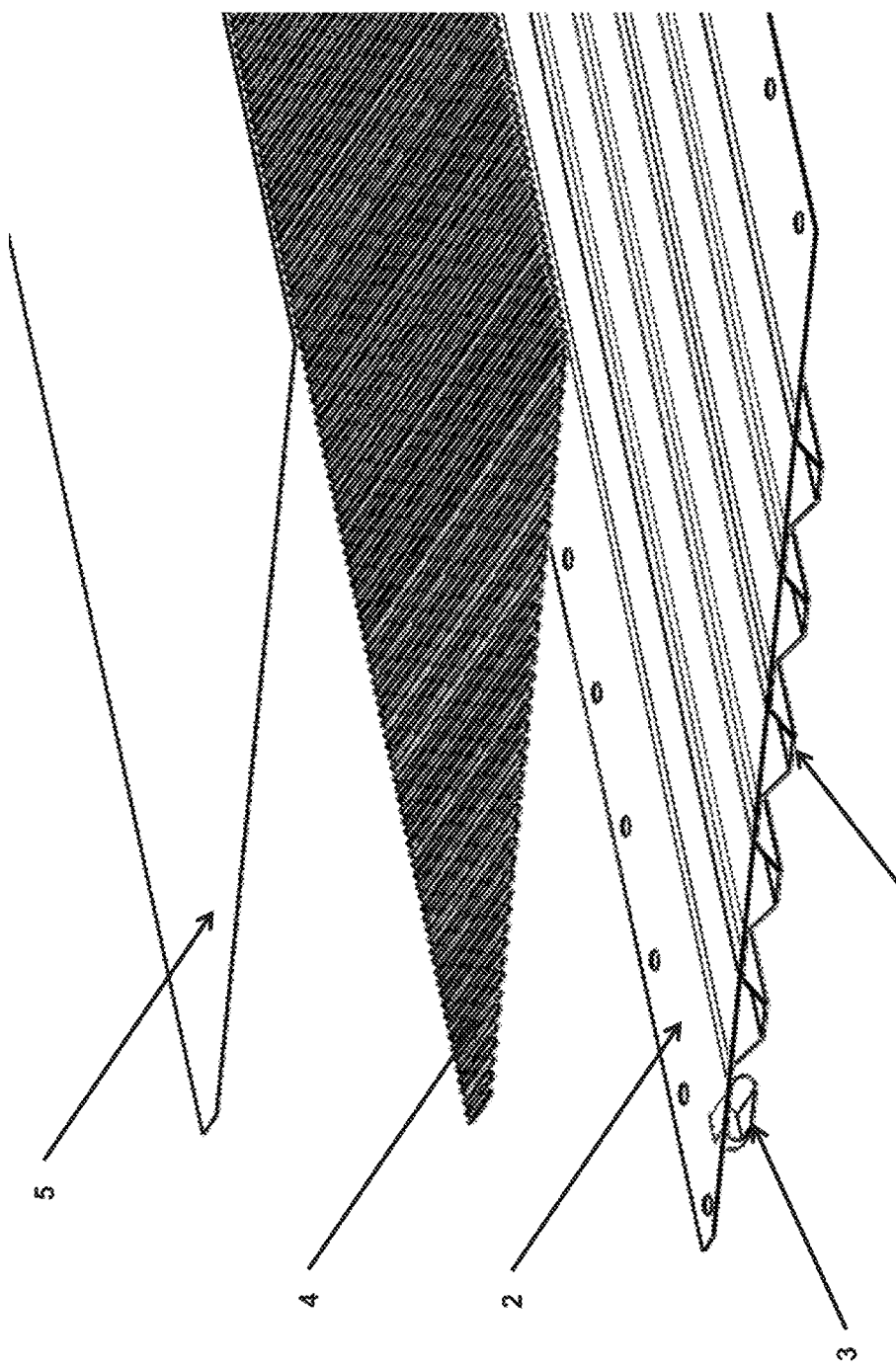
FIG. 7 illustrates some embodiments related to the anode assembly.

As illustrated in FIG. 7, the anode shell 2 containing the plurality of the V-shaped, the U-shaped, or the Z-shaped elements 1 is attached to the anode 4 and/or 5. In some embodiments, the anode is a combination of the corrugated porous anode and a flat mesh anode. The corrugated porous anode and the flat mesh anode have been described in detail in U.S. patent application Ser. No. 13/799,131, filed Mar. 13, 2013, which is incorporated herein by reference in its entirety. The corrugated porous anode may have amplitude of corrugation between about 1 mm to 8 mm. In some embodiments, the anode shell 2 containing the plurality of the V-shaped, the U-shaped, or the Z-shaped elements 1 on one side is stacked with the corrugated anode 4 on the other side, optionally further stacked with a flat mesh anode 5 on top.

In some embodiments, the anode shell comprising the plurality of the V-shaped, the U-shaped, or the Z-shaped elements has the apexes of the V-shaped, the U-shaped, or the Z-shaped elements aligned parallel to the amplitude of corrugation of the corrugated porous anode. In some embodiments, the anode shell comprising the plurality of the V-shaped, the U-shaped, or the Z-shaped elements has the apexes of the V-shaped, the U-shaped, or the Z-shaped elements aligned perpendicular to the amplitude of corrugation of the corrugated porous anode. For example, as illustrated in FIG. 7, the apexes of the U-shaped elements 1 are aligned perpendicular to the amplitude of corrugation of the corrugated porous anode 4. The alignment of the apexes of the V-shaped, the U-shaped, or the Z-shaped elements to the corrugated anode may be parallel or perpendicular so long as the amplitude of the corrugation of the corrugated porous anode is perpendicular to the flow of the anolyte.

In one aspect, there is provided an electrochemical cell comprising one or more combinations of the foregoing embodiments related to the anode assembly. Accordingly, in one aspect, there is provided an electrochemical cell comprising a cathode shell, a cathode positioned inside the cathode shell, an anode shell, an anode positioned inside the anode shell, and one or more ion exchange membranes, wherein the one or more ion exchange membranes are disposed between the anode shell and the cathode shell; and a plurality of V-shaped, U-shaped, or Z-shaped elements positioned outside the anode shell and in electrical contact with the anode. In one aspect, there is provided an electrochemical cell, comprising a cathode shell, a cathode positioned inside the cathode shell, an anode shell, an anode positioned inside the anode shell, and one or more ion exchange membranes, wherein the one or more ion exchange membranes are disposed between the anode shell and the cathode shell; and a plurality of V-shaped, U-shaped, or Z-shaped elements positioned outside the anode shell, wherein each of the V-shaped, the U-shaped, or the Z-shaped elements comprises an apex and a base, and wherein the apexes of the V-shaped, the U-shaped, or the Z-shaped elements comprise conductive contact strips, or wherein the apexes of the V-shaped, the U-shaped, or the Z-shaped elements are coated, bonded, sprayed, or cladded with a conductive metal. One or more of the foregoing aspects and embodiments related to the plurality of V-shaped, U-shaped, or Z-shaped elements (including dimensions and other characteristics), and/or the conductive contact strips may be combined to provide the electrochemical cells. It is to be understood that a combination of the V-shaped, the U-shaped, or the Z-shaped elements may be attached to the anode shell if desired.

The anode assembly provided herein, comprising the anode shell and the plurality of the V-shaped, the U-shaped, or the Z-shaped elements outside the anode shell and further comprising the anode positioned inside the anode shell, is further stacked with other components of the electrochemical cell. An illustrative example is shown in FIG. 1. It is to be understood that while FIG. 1 illustrates the electrochemical cell where the components are reciprocally fastened by peripheral bolting, other electrochemical cells without the peripheral bolting, such as, but not limited to, filter press configurations are well within the scope of the invention. Various spacers and gaskets are provided in between the components to prevent the components from being damaged, as explained before. The membranes such as AEM and/or CEM are placed between the anode and the cathode. An AEM with a built-in separator has been described in detail in U.S. application Ser. No. 15/071,648, filed Mar. 16, 2016, which is incorporated herein by reference in its entirety. The intermediate frame may be placed between the anode assembly and the cathode assembly and in between the AEM and the CEM to provide an intermediate chamber for entry and exit of the electrolyte. An intermediate frame has been described in detail in U.S. patent application Ser. No. 15/498,341, filed Apr. 26, 2017, which is incorporated herein by reference in its entirety.

Figure 8:
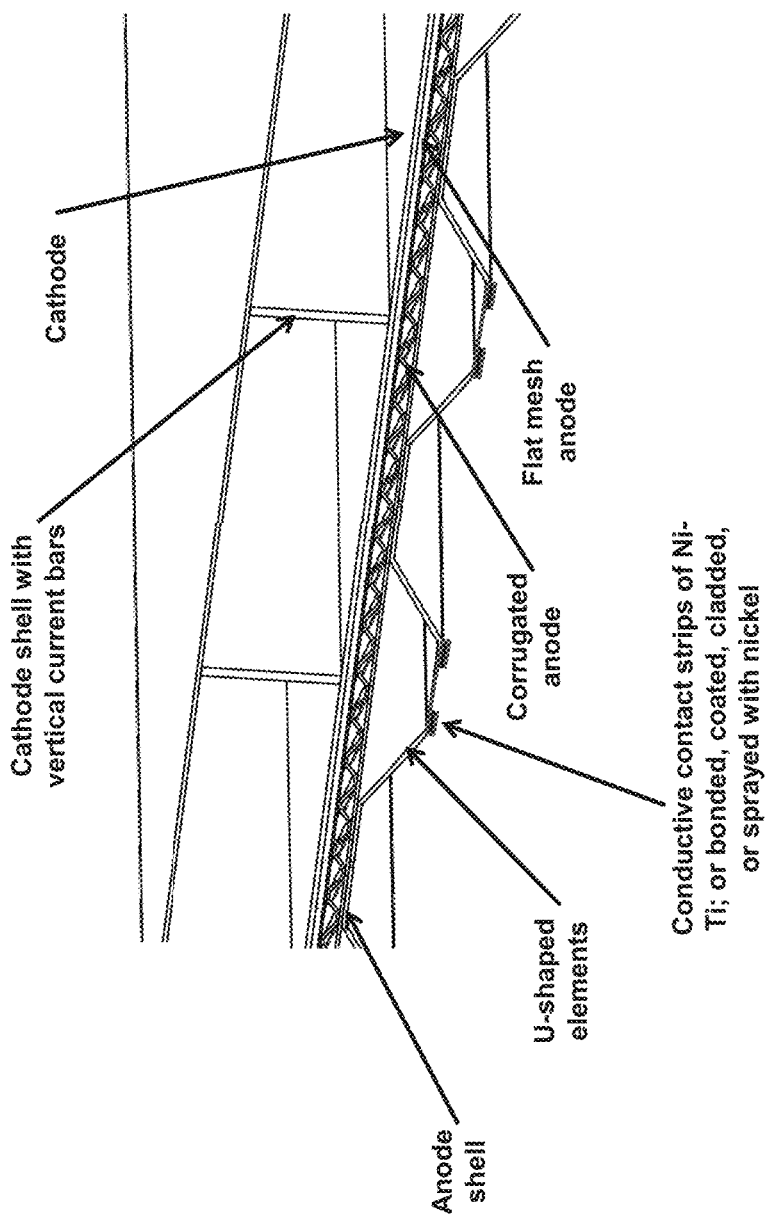
FIG. 8 illustrates some embodiments related to the electrochemical cell containing the anode assembly of the invention.

Typically, the commercially available cathode assembly comprises a cathode shell attached to the cathode and vertical internal current bars that connect the cathode shell/pan with the cathode. FIG. 8 illustrates an electrochemical cell containing the anode assembly of the invention compressed with the cathode assembly comprising the vertical current bars inside the cathode shell.

Figure 9B:
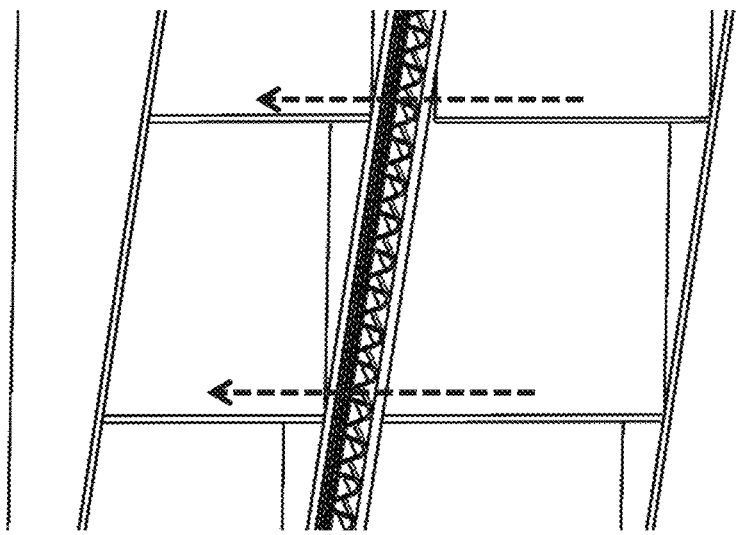
FIGS. 9A and 9B illustrate some embodiments related to the current distribution in the electrochemical cell with and without the anode assembly of the invention.
Figure 9A:
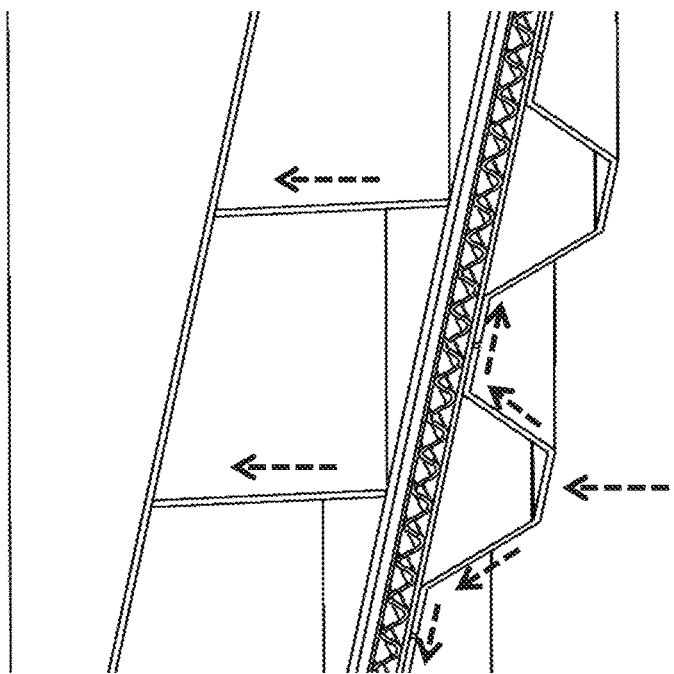

As described before, the typical anode assembly comprises an anode shell attached to the anode and vertical internal current bars (or support bars) that connect the anode shell/pan with the anode. The vertical current bars in the anode shell are aligned with the vertical current bars (or support bars) in the cathode shell in the electrochemical cell to provide a path of least current resistance. The current enters the cell through the anode side and flows from the vertical current bars in the anode assembly to the vertical current bars in the cathode assembly through the cell's full active area. This is illustrated in FIG. 9B where the dashed arrows represent the current pathway going from the vertical current bars in the anode assembly through the vertical current bars in the cathode assembly. The current exits the cell through the vertical internal current bars in the cathode shell. However, this current pathway may not result in a spread of the current and may result in the local thermal degradation of the components of the cell such as, the AEM (high current density may drive high power dissipation, which may lead to relatively high local temperatures). It has been explained in Example 1 herein. However, the plurality of the V-shaped, the U-shaped, or the Z-shaped elements attached to the anode shell help distribute the current flow from the anode side by providing several current injection sites on the apexes of the elements through the conductive contact strips; or coating, spraying, bonding, or cladding of the conductive metal. In some embodiments of the aspects and embodiments provided herein, the each of the bases of the V-shaped, the U-shaped, or the Z-shaped elements are in an alternate alignment with the vertical internal current bars in the cathode shell so that the current distribution is substantially uniform across the one or more ion exchange membranes. As illustrated in FIG. 9A where the dashed arrows represent the current pathway, the relatively long lateral current path through the plurality of the V-shaped, the U-shaped, or the Z-shaped elements, the corrugated anode and the vertical current bars of the cathode, results in a substantially uniform current density across the active area of the cell. The substantially uniform current density reduces or prevents localized high current density and localized high temperatures resulting in reduction or prevention of damage to the membrane and other components of the cell.

In one aspect, there is provided an electrolyzer comprising multiplicity of individual electrochemical cells provided herein. In the electrolyzer, the electrochemical cells are stacked together so that the anode assembly of one electrochemical cell is adjacent to the cathode assembly of the adjacent electrochemical cell. As described before, the attaching of the conductive contact strips of Ni—Ti or Cu—Ti or Fe—Ti (as described above); or the coating, spraying, bonding, or cladding of the conductive metal such as nickel or copper, on the apexes of the elements attached to the anode shell provide current continuity by being in electrical contact with the cathode shell (e.g. made of nickel or copper) of the adjacent electrochemical cell. In some embodiments, the plurality of the V-shaped, the U-shaped, or the Z-shaped elements enable air flow between the cells to provide convective cooling or heating outside the anode shell. In some embodiments, the V-shaped, the U-shaped, or the Z-shaped elements provide a gap of between about 5-50 mm or between about 5-30 mm between the anode and the cathode of two adjacent electrochemical cells stacked in the electrolyzer. The gap between the anode and the cathode of two adjacent electrochemical cells stacked in the electrolyzer is provided by the length of the V-shaped, the U-shaped, or the Z-shaped elements (length has been described herein).

In the foregoing aspects, in some embodiments, the anode is configured to oxidize the metal ions from a lower oxidation state to a higher oxidations state. For example, in some embodiments, the anode is configured to oxidize copper ions from Cu(I)Cl to Cu(II)Cl$_2$. Examples of the other metal ions include, without limitation, copper ions, platinum ions, tin ions, chromium ions, iron ions etc. The metal ions may be present as a metal halide or a metal sulfate.

The electrochemical cell provided herein may be any electrochemical cell that uses the anode assembly of the invention. The reactions in the electrochemical cell using the components of the invention may be any reaction carried out in the electrochemical cell including but not limited to chloralkali processes. In some embodiments, the electrochemical cell has an anode electrolyte containing metal ions and the anode oxidizes the metal ions from the lower oxidation state to the higher oxidation state in the anode chamber. Such electrochemical cells have been described in detail in US Patent Application Publication No. 2012/0292196, filed May 17, 2012, issued as U.S. Pat. No. 9,187,834, issued Nov. 17, 2015, which is incorporated herein by reference in its entirety. It is to be understood that the plurality of the U-shaped, the V-shaped, or the Z-shaped elements are outside the anode shell and therefore, do not come in contact with the anode electrolyte. The anode electrolyte flows through the anode, e.g. through corrugated porous anode and flat mesh anode.

In the electrochemical cells provided herein, the cathode reaction may be any reaction that does or does not form an alkali in the cathode chamber. Such cathode consumes electrons and carries out any reaction including, but not limited to, the reaction of water to form hydroxide ions and hydrogen gas; or reaction of oxygen gas and water to form hydroxide ions (e.g. gas diffusion or oxygen depolarizing cathode); or reduction of protons from an acid such as hydrochloric acid to form hydrogen gas; or reaction of protons from hydrochloric acid and oxygen gas to form water. In some embodiments, the electrochemical cells may include production of alkali in the cathode chamber of the cell.

The electrochemical cells in the methods and systems provided herein are membrane electrolyzers. The electrochemical cell may be a single cell or may be a stack of cells connected in series or in parallel. The electrochemical cell may be a stack of 5 or 6 or 50 or 100 or more electrolyzers connected in series or in parallel. In some embodiments, the electrolyzers provided herein are monopolar electrolyzers. In the monopolar electrolyzers, the electrodes may be connected in parallel where all anodes and all cathodes are connected in parallel. In such monopolar electrolyzers, the operation takes place at high amperage and low voltage. In some embodiments, the electrolyzers provided herein are bipolar electrolyzers. In the bipolar electrolyzers, the electrodes may be connected in series where all anodes and all cathodes are connected in series. In such bipolar electrolyzers, the operation takes place at low amperage and high voltage. In some embodiments, the electrolyzers are a combination of monopolar and bipolar electrolyzers and may be called hybrid electrolyzers.

In some embodiments of the bipolar electrolyzers as described above, the cells are stacked serially constituting the overall electrolyzer and are electrically connected in two ways. In bipolar electrolyzers, a single plate, called bipolar plate, may serve as base plate for both the cathode and anode. The electrolyte solution may be hydraulically connected through common manifolds and collectors internal to the cell stack. The stack may be compressed externally to seal all frames and plates against each other, which are typically referred to as a filter press design. In some embodiments, the bipolar electrolyzer may also be designed as a series of cells, individually sealed, and electrically connected through back-to-back contact, typically known as a single element design. The single element design may also be connected in parallel in which case it would be a monopolar electrolyzer.

In some embodiments, the anode used in the electrochemical systems may contain a corrosion stable base support. Other examples of base materials include, but not limited to, sub-stoichiometric titanium oxides, such as, Magneli phase sub-stoichiometric titanium oxides having the formula TiO$_x$ wherein x ranges from about 1.67 to about 1.9. Some examples of titanium sub-oxides include, without limitation, titanium oxide Ti$_4$O$_7$. The base materials also include, without limitation, metal titanates such as M$_x$Ti$_y$O$_z$ such as M$_x$Ti$_4$O$_7$, etc.

In some embodiments, the anode is not coated with an electrocatalyst. In some embodiments, the electrodes described herein (including anode and/or cathode) contain an electrocatalyst for aiding in electrochemical dissociation, e.g. reduction of oxygen at the cathode or the oxidation of the metal ion at the anode. Examples of electrocatalysts include, but not limited to, highly dispersed metals or alloys of the platinum group metals, such as platinum, palladium, ruthenium, rhodium, iridium, or their combinations such as platinum-rhodium, platinum-ruthenium, titanium mesh coated with PtIr mixed metal oxide or titanium coated with galvanized platinum; electrocatalytic metal oxides, such as, but not limited to, IrO$_2$; silver, gold, tantalum, carbon, graphite, organometallic macrocyclic compounds, and other electrocatalysts well known in the art for electrochemical reduction of oxygen or oxidation of metal.

In some embodiments, the electrodes described herein, relate to porous homogeneous composite structures as well as heterogeneous, layered type composite structures wherein each layer may have a distinct physical and compositional make-up, e.g. porosity and electroconductive base to prevent flooding, and loss of the three phase interface, and resulting electrode performance.

Any of the cathodes provided herein can be used in combination with any of the anodes described above. In some embodiments, the cathode used in the electrochemical systems of the invention, is a hydrogen gas producing cathode. In some embodiments, the cathode used in the electrochemical systems of the invention, is a hydrogen gas producing cathode that does not form an alkali. The hydrogen gas may be vented out or captured and stored for commercial purposes. In some embodiments, the cathode in the electrochemical systems of the invention may be a gas-diffusion cathode. In some embodiments, the gas-diffusion cathode, as used herein, is an oxygen depolarized cathode (ODC). The oxygen at the cathode may be atmospheric air or any commercial available source of oxygen. In some embodiments, the cathode in the electrochemical systems of the invention may be a gas-diffusion cathode that reacts HCl and oxygen gas to form water. The oxygen at the cathode may be atmospheric air or any commercial available source of oxygen.

In some embodiments, the electrolyte in the electrochemical systems and methods described herein include the aqueous medium containing more than 1 wt % water. In some embodiments, the aqueous medium includes more than 1 wt % water; more than 5 wt % water; or more than 5.5 wt % water; or more than 6 wt %; or more than 20 wt % water; or more than 25 wt % water. In some embodiments, the aqueous medium may comprise an organic solvent such as, e.g. water soluble organic solvent.

In some embodiments of the methods and systems described herein, the amount of total metal ion in the anode electrolyte in the electrochemical cell or the amount of copper in the anode electrolyte or the amount of iron in the anode electrolyte or the amount of chromium in the anode electrolyte or the amount of tin in the anode electrolyte or the amount of platinum is between 1-12M; or between 1-11M; or between 1-10M; or between 1-9M; or between 1-8M; or between 1-7M; or between 1-6M; or between 1-5M; or between 1-4M; or between 1-3M; or between 1-2M. In some embodiments, the amount of total ion in the anode electrolyte, as described above, is the amount of the metal ion in the lower oxidation state plus the amount of the metal ion in the higher oxidation state; or the total amount of the metal ion in the higher oxidation state; or the total amount of the metal ion in the lower oxidation state.

In some embodiments of the methods and systems described herein, the anode electrolyte in the electrochemical systems and methods provided herein contains the metal ion and the alkali metal ion such as an alkali metal halide. In some embodiments of the methods and systems described herein, the anode electrolyte in the electrochemical systems and methods provided herein contains the metal ion in the higher oxidation state in the range of 4-7M, the metal ion in the lower oxidation state in the range of 0.1-2M and the electrolyte in the intermediate chamber e.g. alkali metal halide such as sodium chloride in the range of 1-3M. The anode electrolyte may optionally contain 0.01-0.1M hydrochloric acid. In some embodiments of the methods and systems described herein, the anode electrolyte may contain another cation in addition to the metal ion. Other cation includes, but is not limited to, alkaline metal ions and/or alkaline earth metal ions, such as but not limited to, lithium, sodium, calcium, magnesium, etc. The amount of the other cation added to the anode electrolyte may be between 0.01-5M; or between 0.01-1M; or between 0.05-1M; or between 0.5-2M; or between 1-5M.

In some embodiments, the aqueous electrolyte including the catholyte or the cathode electrolyte and/or the anolyte or the anode electrolyte, or the electrolyte introduced into the intermediate frame disposed between the AEM and the CEM, in the systems and methods provided herein include, but not limited to, saltwater or fresh water. The saltwater includes, but is not limited to, seawater, brine, and/or brackish water. Saltwater is employed in its conventional sense to refer to a number of different types of aqueous fluids other than fresh water, where the saltwater includes, but is not limited to, brine as well as other salines having a salinity that is greater than that of freshwater. Brine is water saturated or nearly saturated with salt and has a salinity that is 50 ppt (parts per thousand) or greater.

In some embodiments, the electrolyte including the cathode electrolyte and/or the anode electrolyte and/or the electrolyte introduced into the intermediate frame, such as, saltwater include water containing more than 1% chloride content, e.g. alkali metal halides including sodium halide, potassium halide etc. e.g. more than 1% NaCl; or more than 10% NaCl; or more than 50% NaCl; or more than 70% NaCl; or between 1-99% NaCl; or between 1-70% NaCl; or between 1-50% NaCl; or between 1-10% NaCl; or between 10-99% NaCl; or between 10-50% NaCl; or between 20-99% NaCl; or between 20-50% NaCl; or between 30-99% NaCl; or between 30-50% NaCl; or between 40-99% NaCl; or between 40-50% NaCl; or between 50-90% NaCl; or between 60-99% NaCl; or between 70-99% NaCl; or between 80-99% NaCl; or between 90-99% NaCl; or between 90-95% NaCl. In some embodiments, the above recited percentages apply to ammonium chloride, ferric chloride, potassium chloride, sodium bromide, potassium bromide, sodium iodide, potassium iodide, sodium sulfate, or potassium sulfate as an electrolyte. The percentages recited herein include wt % or wt/wt % or wt/v %. It is to be understood that all the electrochemical systems described herein that contain sodium chloride can be replaced with other suitable electrolytes, such as, but not limited to, ammonium chloride, sodium bromide, sodium iodide, sodium sulfate, potassium salts, or combination thereof.

As used herein, the voltage includes a voltage or a bias applied to or drawn from an electrochemical cell that drives a desired reaction between the anode and the cathode in the electrochemical cell. In some embodiments, the desired reaction may be the electron transfer between the anode and the cathode such that an alkaline solution, water, or hydrogen gas is formed in the cathode electrolyte and the metal ion is oxidized at the anode. In some embodiments, the desired reaction may be the electron transfer between the anode and the cathode such that the metal ion in the higher oxidation state is formed in the anode electrolyte from the metal ion in the lower oxidation state. The voltage may be applied to the electrochemical cell by any means for applying the current across the anode and the cathode of the electrochemical cell. Such means are well known in the art and include, without limitation, devices, such as, electrical power source, fuel cell, device powered by sun light, device powered by wind, and combinations thereof. The type of electrical power source to provide the current can be any power source known to one skilled in the art. For example, in some embodiments, the voltage may be applied by connecting the anodes and the cathodes of the cell to an external direct current (DC) power source. The power source can be an alternating current (AC) rectified into DC. The DC power source may have an adjustable voltage and current to apply a requisite amount of the voltage to the electrochemical cell.

In some aspects, there are provided methods to make, manufacture, and use the anode shell or the anode assembly, the conductive contact strips, and/or the electrochemical cells containing the anode shell or the anode assembly or the conductive contact strips provided herein.

In some aspects, there are provided methods to manufacture Ni—Ti or Cu—Ti conductive contact strip for the electrochemical cell; and attach conductive contact strip to the apex of the V-shaped, U-shaped, or Z-shaped element, provided herein. In some embodiments, the conductive contact strips are attached metallurgically to the elements. In some aspects, there are provided methods to coat, clad, spray, or bond nickel or copper on titanium apex of the V-shaped, U-shaped, or Z-shaped element. The Ni or Cu may be substituted with any suitable conductive metal compatible with the metal of the cathode shell.

In one aspect, there is provided a method comprising contacting an anode shell and an anode positioned inside the anode shell with a cathode shell and a cathode positioned inside the cathode shell in an electrochemical cell; and contacting a plurality of V-shaped, U-shaped, or Z-shaped elements to the outside of the anode shell such that the anode shell is in electrical contact with the plurality of V-shaped, U-shaped, or Z-shaped elements. In some embodiments, the aforementioned method further comprises disposing one or more ion exchange membranes between the anode shell and the cathode shell.

Various embodiments related to the geometry, positioning, dimensions, material of construction, etc. related to the anode shell, the V-shaped, U-shaped, or Z-shaped elements, and the anode assembly containing the same have been provided herein. In some embodiments of the foregoing aspect, each of the V-shaped, the U-shaped, or the Z-shaped elements comprises an apex and a base. In some embodiments of the foregoing aspect and embodiments, each of the V-shaped or the U-shaped elements comprises two legs of equal or unequal length meeting at the apex. The apex and the base of the V-shaped, the U-shaped, or the Z-shaped elements have been described herein.

In some embodiments of the foregoing aspect and embodiments, the method comprises metallurgically attaching each of the bases of the V-shaped, the U-shaped, or the Z-shaped elements to the outside of the anode shell thereby bringing it in electrical contact with the anode. In some embodiments of the foregoing aspect and embodiments, the method comprises metallurgically attaching each of the bases of the V-shaped, the U-shaped, or the Z-shaped elements to the outside of the anode shell and metallurgically attaching the anode to the inside of the anode shell thereby bringing the V-shaped, the U-shaped, or the Z-shaped elements in electrical contact with the anode. Various commercially available techniques for metallurgically attaching the V-shaped, the U-shaped, or the Z-shaped elements to the anode shell and/or for metallurgically attaching the V-shaped, the U-shaped, or the Z-shaped elements to the outside of the anode shell as well as the anode to the inside of the anode shell are well known to the one skilled in the art. Such techniques include, without limitation, diffusion bonding, soldering, welding, cladding e.g. laser cladding, brazing, and the like.

In some embodiments of the foregoing aspect and embodiments, the method further comprises providing conductive contact strips on the apexes of the V-shaped, the U-shaped, or the Z-shaped elements. In some embodiments, the conductive contact strips may be metallurgically attached to the apexes of the V-shaped, the U-shaped, or the Z-shaped elements through the exposed Ti surface of the conductive contact strip (as explained herein and illustrated in FIG. 6).

In some embodiments of the foregoing aspect and embodiments, the conductive contact strips are formed by laser cladding or explosion bonding process. In some embodiments of the foregoing aspect and embodiments, the method comprises laser cladding nickel or copper on titanium or titanium on nickel or copper; or explosion bonding nickel or copper to titanium or titanium to nickel or copper, to form the conductive contact strips.

The conductive contact strips on the anode shell provide a point of electrical contact to induce current in the cell as well as provide a region of electrical contact between the anode shell of one cell with the cathode shell of the adjacent cell when the cells are stacked together in the electrolyzer. The conductive contact strips are made from two conductive metals, one compatible with the conductive metal of the anode shell (e.g. titanium) and one compatible with the conductive metal of the cathode shell (e.g. nickel, copper, iron such as stainless steel or its alloys, silver, gold, aluminum, brass/bronze, carbon, any platinum group metal, or engineered conductive plastics, etc. or alloys thereof).

For example, the conductive contact strips of Ni—Ti can be formed in the explosion bonding process by taking two large sheets of titanium and nickel. The sheets may be cleaned, loaded with blasting powder, and placed in a cave. A controlled explosion may strip contaminants off of the two contacting surfaces, and cause the two materials to weld together. The plates may be cleaned, flattened and machined after the explosion welding process. A longitudinal slot may be milled through the nickel portion of the strip. The strips may be laser welded to the outside of the apexes of the elements (made from titanium; attached to the titanium anode shell) along those longitudinal slots (also shown in FIG. 6). The removal of nickel to expose titanium in the slot prevents the molten nickel and titanium metals from mixing. The conductive contact strips thus formed comprise Ti—Ti weld, and two external Ni strips available for contacting the adjacent Ni cathode shell (illustrated in FIG. 6 or 8).

In some embodiments of the foregoing aspect and embodiments, the conductive contact strips are formed by laser cladding Ni—Ti.

In one aspect, there is provided a method, comprising providing V-shaped, U-shaped, or Z-shaped element, wherein the V-shaped, the U-shaped, or the Z-shaped element comprises an apex and a base, and wherein the V-shaped, U-shaped, or Z-shaped element is made of titanium; and attaching a Ni—Ti or Cu—Ti conductive contact strip to the apex of the V-shaped, U-shaped, or Z-shaped element; or coating, cladding, spraying, or bonding nickel or copper on titanium on the apex of the V-shaped, U-shaped, or Z-shaped element.

In one aspect, there is provided a method to form conductive contact strips for an anode assembly, comprising: laser cladding nickel or copper on titanium or titanium on nickel or copper to form conductive contact strips of Ni—Ti or Cu—Ti and attaching the conductive contact strips on an anode shell or attaching the conductive contact strips on the apexes of the plurality of V-shaped, U-shaped, or Z-shaped elements attached to the anode shell.

In one aspect, there is provided a process to manufacture Ni—Ti or Cu—Ti conductive contact strip for electrochemical cell comprising: depositing Ni or Cu on surface of a Ti strip or depositing Ti on surface of a Ni or Cu strip by laser cladding process to obtain a Ni—Ti or Cu—Ti conductive contact strip for an electrochemical cell. In some embodiments of the aforementioned aspects, the method or the process further comprises providing a longitudinal slot (e.g. illustrated in FIG. 6) in a central part of the Ni—Ti or Cu—Ti conductive contact strip to form two strips of Ni or Cu and exposing a Ti surface of the Ti strip (also illustrated in FIG. 6). In some embodiments, the aforementioned process further comprises attaching the Ni—Ti or Cu—Ti conductive contact strip to an anode shell of an electrochemical cell. In some embodiments, the process further comprises attaching the Ni—Ti or Cu—Ti conductive contact strip to an apex of a V-shaped, U-shaped, or Z-shaped element attached to the anode shell.

In one aspect, there is provided a method of establishing electrical contact between adjacent electrochemical cells in an electrolyzer, the method comprising:

obtaining a Ni—Ti or Cu—Ti conductive contact strip by depositing Ni or Cu on surface of a Ti strip or depositing Ti on surface of Ni or Cu strip by laser cladding process to obtain a Ni—Ti or Cu—Ti conductive contact strip and providing a longitudinal slot in a central part of the Ni—Ti or Cu—Ti conductive contact strip to form two strips of Ni or Cu and exposing a Ti surface of the Ti strip, thereby obtaining a Ni—Ti or Cu—Ti conductive contact strip for the electrochemical cell;

attaching the Ni—Ti or Cu—Ti conductive contact strip to an anode shell of the electrochemical cell by welding the exposed Ti surface of the Ti strip to the anode shell, wherein the anode shell is made of Ti; and establishing an electrical contact between adjacent electrochemical cells in the electrolyzer by contacting the anode shell of the electrochemical cell with a cathode shell of an adjacent electrochemical cell via the two strips of Ni or Cu in the Ni—Ti or Cu—Ti conductive contact strip.

In some embodiments, there is provided a method of establishing electrical contact between adjacent electrochemical cells in an electrolyzer, the method comprising:

obtaining a Ni—Ti or Cu—Ti conductive contact strip by depositing Ni or Cu on surface of a Ti strip or depositing Ti on surface of Ni or Cu strip by laser cladding process to obtain a Ni—Ti or Cu—Ti conductive contact strip and providing a longitudinal slot in a central part of the Ni—Ti or Cu—Ti conductive contact strip to form two strips of Ni or Cu and exposing a Ti surface of the Ti strip, thereby obtaining a Ni—Ti or Cu—Ti conductive contact strip for the electrochemical cell;

attaching the Ni—Ti or Cu—Ti conductive contact strip to plurality of V-shaped, U-shaped, or Z-shaped elements positioned outside an anode shell by welding the exposed Ti surface of the Ti strip to apexes of the plurality of the V-shaped, U-shaped, or Z-shaped elements, wherein the V-shaped, U-shaped, or Z-shaped elements are made of Ti; and establishing an electrical contact between adjacent electrochemical cells in the electrolyzer by contacting the anode shell of the electrochemical cell with a cathode shell of an adjacent electrochemical cell via the two strips of Ni or Cu in the Ni—Ti or Cu—Ti conductive contact strip.

In some embodiments of the aforementioned aspects and embodiments, the depositing the Ni or Cu comprises depositing Ni powder, Ni metal wire, Cu powder, or Cu metal wire or depositing the Ti comprises depositing Ti powder or Ti metal wire. In some embodiments, the process further comprises milling the strip before or after providing the longitudinal slot to flatten surface of the conductive contact strip. In some embodiments, the depositing of Ni or Cu step is done while destroying or removing oxide layer from Ti strip.

As explained above, the Ti of the anode shell or of the elements provided herein may rapidly form a tenacious, high-resistance oxide coating when exposed to air. This coating may need to be destroyed or removed before Ni, Cu, or Fe layer is deposited or coated or cladded or sprayed on the Ti surface of the strip or on the Ti apexes of the elements. In some embodiments of the aspects and embodiments provided herein, the laser cladding or the explosion bonding process to form conductive contact strips, or the coating, bonding, cladding or spraying process on the apexes of the elements as described above, may be done while or after destroying or removing oxide layer from Ti surface. In some embodiments, the oxide layer can be destroyed or removed from the Ti surface of the Ti strip before or while the coating, cladding, bonding, or the spraying process by sand blasting, mechanical abrasion, treatment with alumina, or acid pickling.

In some embodiments, during the laser cladding process, the Ni or Cu powder or metal wire used may also contain particles of alumina which may remove the coating of the oxide layer from the Ti surface during the laser cladding process while cladding a layer of Ni or Cu on the Ti surface (thereby obviating an additional step of oxide layer removal). In the acid pickling process, the anode shell or the elements provided herein may be put in acid solution (e.g. nitric acid or hydrofluoric acid) at high temperature to remove oxide layer.

After the removal of the oxide layer, the anode shell or the elements may need to be kept in inert atmosphere until the Ni or Cu is applied to the Ti surface using any of the methods described herein.

In some embodiments, the Ni or Cu powder or metal wire further comprises alumina to destroy or remove oxide layer from Ti. In some embodiments, the process further comprises destroying or removing oxide layer from the Ti surface of the Ti strip before the laser cladding process by sand blasting, mechanical abrasion, treatment with alumina, or acid pickling. In some embodiments, the process further comprises keeping the Ti strip in inert atmosphere until subjecting the Ti strip to the laser cladding process.

Laser cladding is an additive process that involves the deposition of a molten metal (e.g. Ni or Cu or any other conductive metal described herein) onto another target metal (e.g. Ti) surface. The laser cladding process is a hard coating technique in which a cladding material with the desired properties is fused onto a metal substrate by means of a laser beam, resulting in a metallurgical bond between the cladding material and the metal substrate. Laser cladding can yield a cladding layer that can have superior properties in terms of pureness, homogeneity, hardness, bonding and microstructure, as compared to other hard coating techniques. The laser beam can be controlled to provide focused heating and localized melting of the substrate (e.g. titanium) and the cladding material (e.g. nickel or copper). Compared to conventional welding, laser cladding can provide minimal dilution and a small heat affected zone where the substrate and the cladding material melt and minimally mix together to achieve the metallurgical bond. A high degree of mixing between the cladding material and the substrate, which can deteriorate the properties of the resulting cladding layer, can be avoided using a laser cladding process. The laser cladding process can be automated and can be controlled to precisely coat a selective surface region of the apexes of the V-shaped, the U-shaped, or the Z-shaped elements with a cladding layer of conductive metal conducive to the cathode shell, for example only, Ni, copper, or iron/iron alloy. The thickness of the cladding layer can be selected depending on the target structural properties and/or cosmetic properties (e.g., color, shininess and/or texture). The laser cladding process can control the deposition of the cladding layer to achieve a desired thickness varying between several micrometers to several millimeters.

A wide selection of homologous and non-homologous powder materials can be used as the cladding material, and the materials can be selected depending on the target structural properties and/or cosmetic properties. In some embodiments, the cladding material can include a conductive metal such as but not limited to nickel, copper, or stainless steel. The ratio of the cladding material to the substrate material can be selected depending on the target structural properties and/or cosmetic properties. For example, increasing the loading of the nickel particles in a metal matrix can achieve a harder, more brittle cladding layer. Decreasing the loading of the nickel particles in the metal matrix can achieve a cladding layer that is less brittle (i.e., lower fracture toughness) and has a lower hardness. A harder cladding layer can be more resistant to abrasions, scratches and other wear, and a less brittle cladding layer can be more resistant to fracturing when subject to impact forces during use of the anode assembly.

A laser cladding process can involve a 1-stage or a 2-stage process, as known to one of skill in the relevant arts. In a 1-stage process, the cladding material may be applied during application of the laser beam (e.g., as a powder or wire fed alongside the laser beam). The powder can be injected onto the substrate by either coaxial or lateral nozzles relative to the laser's position as known in the art. In a 2-stage process, the cladding material may be preplaced on the substrate surface (e.g., as preplaced powder, paste/binder mix, plate, wire, through plasma spraying or flame spraying). The cladding material may be then melted onto the substrate using a laser beam. Thereafter, if desired, another clad layer can be deposited on top of the first clad layer to achieve a desired thickness or property of the final cladding layer. Either the laser beam or the substrate can be kept stationary while the other of the substrate or the laser beam is controlled to move in the x, y, z, directions so that the beam tracks along the surface of the substrate, locally melting the cladding material in the beam's path to bond the cladding material onto the substrate. In some embodiments, the metal substrate can be preheated before laser cladding, in order to reduce the cooling rates in the cladding layer and minimize or prevent cracking of the layer on cooling.

The resulting cladding layer on the titanium contact strips or the titanium apexes of the elements can be one or more stacked clad layers. In some embodiments, the cladding layer is one clad layer, and in some embodiments, the clad layer is a plurality of clad layers.

The laser cladded strips may be laser welded to the outside of the apexes of the elements attached to the titanium anode shell (e.g. through the longitudinal slots described above). The strips can be attached to the apexes before or after the elements are attached to the titanium anode shell. Laser cladding may also provide a metallurgical bond between the Ni—Ti. Laser cladding may provide lower part count and reduced cost as well as provide relatively wide contacts. Various laser cladding techniques are known and all are applicable herein. Example include, without limitation, laser cladding with co-axial powder, laser cladding with lateral feed powder, laser cladding with cold wire, laser cladding with hot wire, etc.

In some embodiments of the foregoing aspect and embodiments, the method comprises cladding the apexes of the V-shaped, the U-shaped, or the Z-shaped elements with the conductive metal such as, e.g. nickel. In this embodiment, the laser cladding of the nickel is performed directly on the titanium apexes of the V-shaped, the U-shaped, or the Z-shaped elements. The laser cladding operation can be performed on the apexes of the elements either before the V-shaped, the U-shaped, or the Z-shaped elements are welded to the anode shell, or subsequent to welding.

In some embodiments of the foregoing aspect and embodiments, the method comprises coating the apexes of the V-shaped, the U-shaped, or the Z-shaped elements with the conductive metal such as, e.g. nickel. In some embodiments, the coating is an electroless coating of the nickel on the titanium apexes of the V-shaped, the U-shaped, or the Z-shaped elements.

In some embodiments of the foregoing aspect and embodiments, the method comprises manufacturing the plurality of V-shaped, U-shaped, or Z-shaped elements by explosion bonding or laser cladding nickel and titanium to form Ni—Ti sheets and configuring the Ni—Ti sheets to form the plurality of V-shaped, U-shaped, or Z-shaped elements. The configuring may include cutting, polishing, bending etc. to achieve the desired shape of the elements.

In some embodiments of the foregoing aspect and embodiments, the method comprises providing electrical continuity through the conductive contact strips, between the anode shell of the electrochemical cell with a cathode shell of an adjacent electrochemical cell when the electrochemical cells are stacked in an electrolyzer.

In some embodiments of the foregoing aspect and embodiments, the method comprises applying voltage to the anode and the cathode shell or passing current through the cell.

In some embodiments of the foregoing aspect and embodiments, the method comprises providing vertical internal current bars inside the cathode shell. In some embodiments of the foregoing aspect and embodiments, the method comprises aligning each of the bases of the V-shaped, the U-shaped, or the Z-shaped elements in an alternate alignment with the vertical internal current bars and providing substantially uniform current distribution across the one or more ion exchange membranes.

In some embodiments of the foregoing aspect and embodiments, the method comprises providing substantially uniform current distribution in the electrochemical cell through the plurality of the V-shaped, the U-shaped, or the Z-shaped elements.

In some embodiments of the foregoing aspect and embodiments, the method comprises enabling air flow to provide convective cooling or heating outside the anode shell through the plurality of the V-shaped, the U-shaped, or the Z-shaped elements.

In some embodiments of the foregoing aspect and embodiments, the method comprises the anode comprising a corrugated porous anode having an amplitude of corrugation. In some embodiments of the foregoing aspect and embodiments, the method comprises contacting the plurality of the V-shaped, the U-shaped, or the Z-shaped elements to the outside of the anode shell such that the apexes of the elements are perpendicular to the amplitude of corrugation of the corrugated porous anode. In some embodiments of the foregoing aspect and embodiments, the method comprises contacting the plurality of the V-shaped, the U-shaped, or the Z-shaped elements to the outside of the anode shell such that the apexes of the elements are parallel to the amplitude of corrugation of the corrugated porous anode.

In one aspect, there is provided a process for manufacturing an anode assembly, comprising attaching a plurality of V-shaped, U-shaped, or Z-shaped elements positioned outside an anode shell; and attaching an anode inside the anode shell. In some embodiments, the process comprises metallurgically attaching the plurality of the V-shaped, the U-shaped, or the Z-shaped elements outside the anode shell such that the plurality of the V-shaped, the U-shaped, or the Z-shaped elements are in electrical contact with the anode. In some embodiments, the process comprises metallurgically attaching the plurality of the V-shaped, the U-shaped, or the Z-shaped elements outside the anode shell and metallurgically attaching the anode inside the anode shell such that the plurality of the V-shaped, the U-shaped, or the Z-shaped elements are in electrical contact with the anode. In some embodiments, each of the plurality of the V-shaped, the U-shaped, or the Z-shaped elements comprise an apex and a base and each of the bases of the plurality of the V-shaped, the U-shaped, or the Z-shaped elements are attached outside the anode shell.

In some embodiments of the foregoing aspect and embodiments, the process comprises providing conductive contact strips on the apexes of the V-shaped, the U-shaped, or the Z-shaped elements.

In some embodiments of the foregoing aspect and embodiments, the process comprises coating the apexes of the V-shaped, the U-shaped, or the Z-shaped elements with nickel or copper, before or after the attaching step.

In some embodiments of the foregoing aspect and embodiments, the process comprises laser cladding the apexes of the V-shaped, the U-shaped, or the Z-shaped elements with nickel or copper, before or after the attaching step.

In one aspect, there is provided a process for manufacturing an electrochemical cell, comprising assembling an individual electrochemical cell by joining together the anode electrode assembly provided herein with a cathode assembly comprising a cathode shell and a cathode; placing the anode assembly and the cathode assembly in parallel and separating them by one or more ion exchange membranes; and supplying the electrochemical cell with feeders for a cell current and an electrolysis feedstock.

In one aspect, there is provided a process for manufacturing or assembling an electrolyzer, comprising assembling individual electrochemical cells as described herein and placing a plurality of assembled electrochemical cells side by side in a stack and bracing them together so as to sustain electrical contact between the cells. In some embodiments, the electrical contact between the anode shell of one electrochemical cell and the cathode shell of the adjacent electrochemical cell is through the conductive contact strips on the apexes of the V-shaped, the U-shaped, or the Z-shaped elements positioned outside the anode shell. In some embodiments, the electrical contact between the anode shell of one electrochemical cell and the cathode shell of the adjacent electrochemical cell is through electroless or electrolytic coating of nickel or copper, or laser cladded nickel or copper, or explosion bonded nickel or copper, or sprayed nickel or copper (or any other conducive conductive element) on the apexes of the V-shaped, the U-shaped, or the Z-shaped elements.

The electron(s) generated at the anode are used to drive the reaction at the cathode. The cathode reaction may be any reaction known in the art. The anode chamber and the cathode chamber are separated by the IEMs and the intermediate frame provided herein that may allow the passage of ions, such as, but not limited to, sodium ions in some embodiments to the cathode electrolyte if the electrolyte in the intermediate chamber is alkali metal halide solution such as sodium (or any other alkali metal ion) chloride, sodium bromide, sodium iodide, sodium sulfate; or ammonium ions if the electrolyte is ammonium chloride etc.; or an equivalent solution containing metal halide. In some embodiments, the IEMs and the intermediate frame allow the passage of anions, such as, but not limited to, chloride ions, bromide ions, iodide ions, or sulfate ions to the anode electrolyte if the electrolyte in the intermediate chamber is e.g., alkali metal halide solution such as sodium chloride, sodium bromide, sodium iodide, or sodium sulfate or an equivalent solution. The sodium ions may combine with hydroxide ions in the cathode electrolyte to form sodium hydroxide. The anions may combine with metal ions in the anode electrolyte to form metal halide or metal sulfate.

In some embodiments of the electrochemical cell, the electrolyte (e.g., alkali metal halide such as sodium (or any other alkali metal ion) chloride, sodium bromide, sodium iodide, sodium sulfate, or ammonium chloride, HCl, or combinations thereof or an equivalent solution) is disposed through the manifold into the intermediate frame between the AEM and the CEM. The ions, e.g. sodium ions, from the electrolyte pass from the intermediate chamber through CEM to form e.g. sodium hydroxide in the cathode chamber and the halide anions such as, chloride, bromide or iodide ions, or sulfate anions, from the electrolyte pass from the intermediate chamber through the AEM to form HCl or a solution for metal halide or metal sulfate in the anode chamber. The electrolyte, after the transfer of the ions, can be withdrawn from the intermediate frame in the intermediate chamber as depleted ion solution. For example, in some embodiments when the electrolyte is sodium chloride solution, then after the transfer of the sodium ions to the cathode electrolyte and transfer of chloride ions to the anode electrolyte, the depleted sodium chloride solution may be withdrawn from the intermediate frame in the intermediate chamber.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Anode Assembly with Plurality of U-Shaped Elements

In this experiment, a comparison was made between the performance of two cells illustrated in FIGS. 9A and 9B.

Figure 10B:
FIGS. 10A and 10B illustrate experimental results as described in Example 1 herein.
Figure 10A:
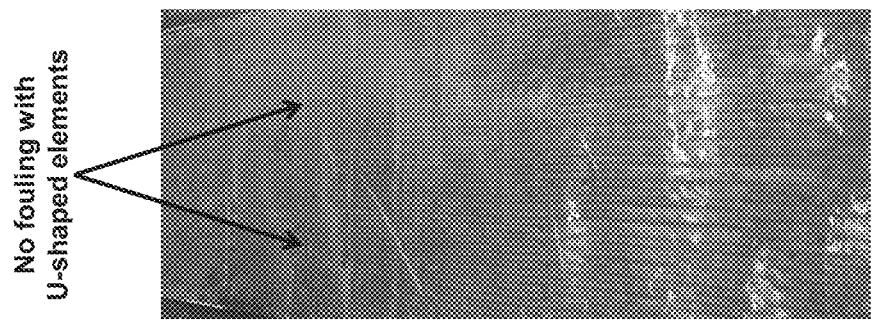

FIG. 9A illustrates a cell with an anode assembly that contained a sheet containing five U-shaped elements attached outside the anode shell where the length of each U-shaped element ("C" in the figures or the amplitude of the U-shape) was 36 mm and FIG. 9B illustrates a similar cell except that it contained vertical internal current bars in the anode shell aligned with the vertical internal current bars in the cathode shell. It was observed that when the cell of FIG. 9B was run for less than 1 hour at 300 mA/cm$^2$, AEM showed significant damage (as shown in FIG. 10B) due to relatively high current densities in the vicinity of the current bars. However, when the cell of FIG. 9A of the invention was used, the AEM showed no damage (as shown in FIG. 10A) even when the cell was run for about 20 hrs at 300 mA/cm$^2$.

What is claimed is:

1. An anode assembly, comprising:
    an anode shell;
    an anode positioned inside the anode shell; and
    a plurality of V-shaped, U-shaped, or Z-shaped elements positioned outside the anode shell and in electrical contact with the anode wherein the anode comprises a corrugated porous anode.

2. The anode assembly of claim 1, wherein the anode is inside the anode shell.

3. The anode assembly of claim 1, wherein the anode further comprises a flat mesh anode.

4. The anode assembly of claim 1, wherein the corrugated porous anode has an amplitude of corrugation between about 1 mm to 8 mm.

5. The anode assembly of claim 1, wherein each of the V-shaped, the U-shaped, or the Z-shaped elements comprises an apex and a base.

6. The anode assembly of claim 5, wherein the apexes of the V-shaped, the U-shaped, or the Z-shaped elements align parallel to amplitude of corrugation of the corrugated porous anode.

7. The anode assembly of claim 5, wherein the apexes of the V-shaped, the U-shaped, or the Z-shaped elements align perpendicular to amplitude of corrugation of the corrugated porous anode.

8. The anode assembly of claim 5, wherein the length between the apex and the base of the V-shaped, the U-shaped, or the Z-shaped element is between about 5-30 mm.

9. The anode assembly of claim 5, wherein the distance between the apexes of adjacent V-shaped, adjacent U-shaped, or adjacent Z-shaped elements is between about 5-200 mm.

10. The anode assembly of claim 5, wherein each of the bases of the V-shaped, the U-shaped, or the Z-shaped elements is metallurgically attached to the outside of the anode shell bringing it in electrical contact with the anode.

11. The anode assembly of claim 5, wherein the apexes of the V-shaped, the U-shaped, or the Z-shaped elements comprise conductive contact strips; are coated with nickel, copper, or iron; cladded with nickel, copper, or iron; sprayed with nickel, copper, or iron; bonded with nickel, copper, or iron; or combinations thereof.

12. The anode assembly of claim 11, wherein the conductive contact strips comprise explosion bonded Ni-Ti, explosion bonded Cu-Ti, laser cladded Cu-Ti, or laser cladded Ni-Ti.

13. An electrochemical cell, comprising: the anode assembly of claim 1; a cathode shell, a cathode positioned inside the cathode shell, and one or more ion exchange membranes, wherein the one or more ion exchange membranes are disposed between the anode shell and the cathode shell.

14. The electrochemical cell of claim 13, wherein each of the V-shaped, the U-shaped, or the Z-shaped elements comprises an apex and a base and the apexes of the V-shaped, the U-shaped, or the Z-shaped elements align parallel or perpendicular to amplitude of corrugation of the corrugated porous anode.

15. An electrolyzer comprising multiplicity of individual electrochemical cells of claim 13.

16. A method comprising:
    contacting an anode shell and an anode positioned inside the anode shell with a cathode shell and a cathode positioned inside the cathode shell in an electrochemical cell wherein the anode comprises a corrugated porous anode; and
    contacting a plurality of V-shaped, U-shaped, or Z-shaped elements to the outside of the anode shell such that the anode shell is in electrical contact with the plurality of V-shaped, U-shaped, or Z-shaped elements.

17. The method of claim 16, wherein each of the V-shaped, the U-shaped, or the Z-shaped elements comprises an apex and a base.

18. The method of claim 17, further comprising metallurgically attaching each of the bases of the V-shaped, the U-shaped, or the Z-shaped elements to the outside of the anode shell thereby bringing it in electrical contact with the anode.

19. The method of claim 17, wherein the apexes of the V-shaped, the U-shaped, or the Z-shaped elements align parallel or perpendicular to amplitude of corrugation of the corrugated porous anode.

20. The method of claim 16, wherein the anode further comprises a flat mesh anode.

* * * * *